US012768849B2

(12) United States Patent
Anderson et al.

(10) Patent No.: US 12,768,849 B2
(45) Date of Patent: Oct. 20, 2026

(54) SYSTEMS AND METHODS FOR COVERSLIPPING SLIDES

(71) Applicant: Agilent Technologies, Inc., Santa Clara, CA (US)

(72) Inventors: Rolfe Anderson, Saratoga, CA (US); Adrienne Mccampbell, San Jose, CA (US); Victor Lim, Pacifica, CA (US); Carol T. Schembri, San Mateo, CA (US); Michal Johannsen, Brøndby (DK); Flemming Lassen Nielsen, Santa Clara, CA (US)

(73) Assignee: AGILENT TECHNOLOGIES, INC., Santa Clara, CA (US)

( * ) Notice: Subject to any disclaimer, the term of this patent is extended or adjusted under 35 U.S.C. 154(b) by 932 days.

(21) Appl. No.: 18/001,581

(22) PCT Filed: Jun. 11, 2021

(86) PCT No.: PCT/US2021/037038

§ 371 (c)(1),
(2) Date: Dec. 12, 2022

(87) PCT Pub. No.: WO2021/252916

PCT Pub. Date: Dec. 16, 2021

(65) Prior Publication Data

US 2023/0236211 A1 Jul. 27, 2023

Related U.S. Application Data

(60) Provisional application No. 63/038,264, filed on Jun. 12, 2020.

(51) Int. Cl.
*G01N 1/00* (2006.01)
*G01N 1/30* (2006.01)
(Continued)

(52) U.S. Cl.
CPC ......... *G01N 35/00029* (2013.01); *G01N 1/30* (2013.01); *G01N 1/312* (2013.01);
(Continued)

(58) Field of Classification Search
None
See application file for complete search history.

(56) References Cited

U.S. PATENT DOCUMENTS 3,939,019 A * 2/1976 Pickett .................. G03D 15/06 156/57
4,203,797 A 5/1980 Stormby
(Continued)

FOREIGN PATENT DOCUMENTS

AU 2012200839 A1 3/2012
CN 208531869 U 2/2019
(Continued)

OTHER PUBLICATIONS

"Partial Supplementary Search Report", from corresponding European Patent Application No. 21822257.8, Jun. 12, 2024.
(Continued)

*Primary Examiner* — Jyoti Mutreja

(57) ABSTRACT

Systems and methods for coverslipping a sample on a slide employ a coverslip tape. The systems and methods can reduce or eliminate the use of xylene and other toxic solvents for coverslipping.

13 Claims, 24 Drawing Sheets

(51) Int. Cl.
*G01N 1/31* (2006.01)
*G01N 35/00* (2006.01)
(52) U.S. Cl.
CPC .................. *G01N 2001/302* (2013.01); *G01N 2001/305* (2013.01); *G01N 2035/00079* (2013.01); *G01N 2035/00089* (2013.01); *G01N 2035/00138* (2013.01); *G01N 2035/00346* (2013.01)

(56) References Cited

U.S. PATENT DOCUMENTS

| | | | |
|---|---|---|---|
| 4,455,188 A | 6/1984 | Stormby | |
| 4,853,262 A | 8/1989 | Horie et al. | |
| 5,569,527 A | 10/1996 | Waterhouse et al. | |
| 6,589,650 B1 | 7/2003 | Govek et al. | |
| 8,388,891 B2 | 3/2013 | Lefebvre | |
| 2002/0037269 A1 | 3/2002 | Liotta et al. | |
| 2005/0186114 A1 | 8/2005 | Reinhardt et al. | |
| 2007/0134798 A1 | 6/2007 | McCormick et al. | |
| 2007/0166197 A1 | 7/2007 | Hauke et al. | |
| 2010/0069259 A1 | 3/2010 | Bushway et al. | |
| 2010/0081579 A1 | 4/2010 | Bushway et al. | |
| 2014/0348725 A1 | 11/2014 | Berberich | |
| 2015/0147779 A1 | 5/2015 | Simon et al. | |
| 2016/0018428 A1* | 1/2016 | Mische | G01N 35/1002 422/66 |
| 2016/0282376 A1 | 9/2016 | Keller et al. | |
| 2018/0339875 A1 | 11/2018 | Rodriguez et al. | |
| 2019/0242921 A1 | 8/2019 | Drechsler et al. | |
| 2019/0257846 A1 | 8/2019 | Reinhardt et al. | |

FOREIGN PATENT DOCUMENTS

| | | | |
|---|---|---|---|
| EP | 1742032 | B1 | 6/2013 |
| GB | 2482726 | A | 2/2012 |
| JP | 2006-308575 | A | 11/2006 |
| KR | 20200017951 | A | 2/2020 |
| WO | 9953357 | A1 | 10/1999 |
| WO | 0212857 | A1 | 2/2002 |
| WO | 2014071959 | A1 | 5/2014 |

OTHER PUBLICATIONS

PCT, et al.,Notification of Transmittal of The International Search Report & Written Opinion mailed on Oct. 26, 2021, Application No. PCT/US2021/037038 , 16 Pages.
Australian Examination report No. 2 mailed Oct. 11, 2025 in Australian Patent Application No. 2021288222.
Applicant's Submission filed with European Patent Office in European Patent Application No. 21822257.8, on Mar. 14, 2025.
Office Action issued in European Patent Application No. 21822257.8, dated Feb. 26, 2026.

* cited by examiner (a) (b)

SYSTEMS AND METHODS FOR COVERSLIPPING SLIDES

CROSS REFERENCE TO RELATED APPLICATIONS

This application is a U.S. national stage entry of International Application No. PCT/US2021/037038, filed on Jun. 11, 2021, which claims the benefit of U.S. Provisional Patent Application No. 63/038,264, filed Jun. 12, 2020, the contents of which are incorporated herein by reference in their entirety.

FIELD

The present disclosure relates to the preparation of slides for analysis, more particularly to mounting and coverslipping a sample on a slide.

BACKGROUND

The preparation of tissue samples for histological analysis generally includes fixation of the sample (for example, using formalin), embedding the sample in paraffin, sectioning the embedded sample with a microtome, and mounting the tissue section on a slide. Subsequently, the paraffin is usually removed by treatment with a solvent, and the tissue sample can be treated with a dye, stain or other reagent. After such treatment, a mounting medium is usually applied to the sample and a coverslip is applied to the sample and slide. For example, a liquid mountant is deposited on the sample, a glass coverslip applied, and then the solvent is allowed to dry.

Histology slides are typically coverslipped using either xylene-based or aqueous-based methods. Clinical pathologists generally favor xylene-based methods since they are considered more reliable and permanent than aqueous-based methods.

A mounting medium can serve one or more purposes in preparing a coverslipped sample. It can help hold a sample in place during imaging and prevent the sample from drying out. It is desirable for a mounting medium to have a desirable refractive index for the objective used for imaging. The mounting medium can also contribute to preserving the sample over time for long-term storage. An exemplary mounting medium is Dako Mounting Medium, which is commercially available from Agilent Technologies, Inc. Dako Mounting Medium contains toluene and xylene, and it is a low viscosity, fast drying mounting medium designed for use with an automated glass coverslipper.

Coverslipping approaches using a liquid mounting medium have some disadvantages. The mountant can occasionally coat the edge of the slide and interfere with automated handling. The dispensing of some mounting media requires fluid handling of a viscous material and it can clog tubing and leave a residual chemical film on the equipment. The glass coverslips loaded manually by the user can jam and break causing interruptions in processing. The quantity of mountant is critical because too little leaves voids or bubbles, and too much can ooze out the sides. After application a lengthy drying step is necessary.

Another approach to coverslipping uses mountant-coated cellulose acetate tape (Sakura Tissue Tek, Sakura Finetek Japan Co., Ltd. Tokyo, Japan). However, the tape is activated using xylene.

The use of xylene presents a significant disadvantage to many existing approaches for coverslipping because xylene is considered toxic and flammable. It is recommended that coverslipping instrumentation that use xylene should be positioned within a chemical safety hood for ventilation, which adds complications and higher operating costs. The elimination of xylene from coverslipping processes is desirable because xylene has been designated as a potential carcinogen by the European Union and is being discouraged by various authorities in many countries.

Another disadvantage of some existing approaches is that the presence of water in coverslipped samples has not been well tolerated. However, in some sample treatments, such as immunohistochemistry (IHC), the final staining step is aqueous, so the sample must be dehydrated with a solvent before coverslipping. A coverslipping approach that accepts samples in water would be advantageous by eliminating or automating this step.

Some existing aqueous coverslipping methods are considered unreliable for clinical use because the coverslip is not secured to the slide (this requires an additional glue step) and the sample can dry out over a few days making it unsuitable for long term storage.

SUMMARY

The present disclosure provides improved systems and methods for coverslipping a pathology sample. The present systems and methods may provide one or more advantages over existing systems and methods, including, for example, the reduction or elimination of xylene and other toxic solvents; simplifying automated coverslipping by reducing the number of mechanical manipulations and eliminating liquid mountant dispensing and glass coverslip handling; improving the reliability of automated handling of the coverslipped slide by reducing or eliminating mountant fouling or coating of the slide edge; improving the speed of processing by eliminating the need for solvent drying before handling; and speeding up IHC processing by permitting or enabling use of aqueous wetted samples.

In some embodiments of the present methods, the adhesive penetrates the sample and/or bonds to the sample, thereby providing longer storage stability.

DETAILED DESCRIPTION

Figure 1:
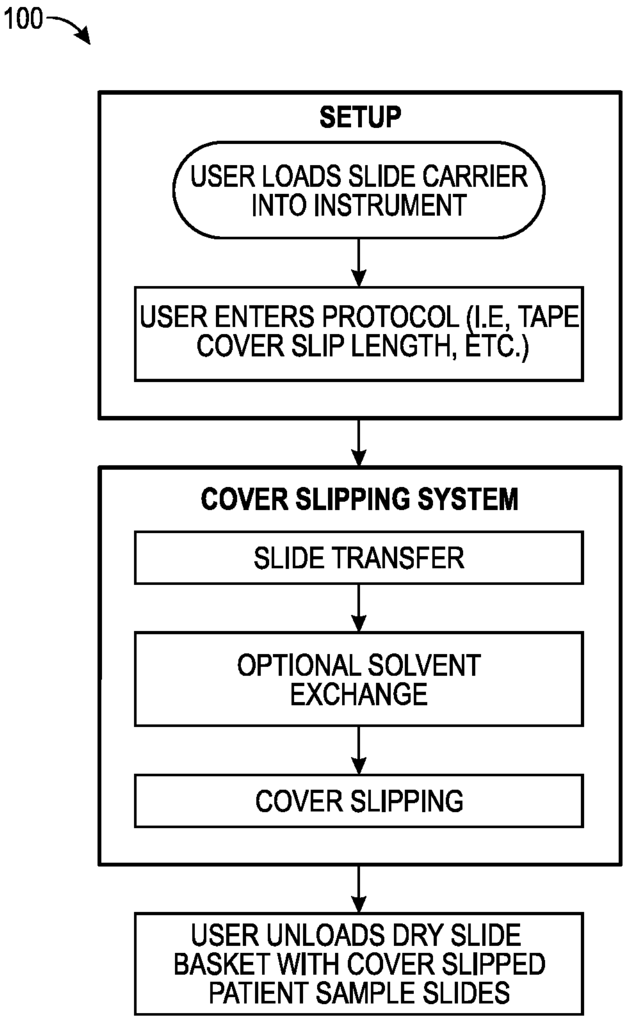
FIG. 1 shows an exemplary embodiment of a coverslipping system and process.

Before the various embodiments are described, it is to be understood that the teachings of this disclosure are not limited to the particular embodiments described. Unless defined otherwise, the technical and scientific terms used herein have the meaning as commonly understood by those working in the fields to which this disclosure pertain. All patents and publications referred to herein are expressly incorporated by reference in their entireties.

As used herein, the terms "approximately" and "about" mean to within an acceptable limit or amount to one having ordinary skill in the art. The term "about" generally refers to plus or minus 15% of the indicated number. For example, "about 10" may indicate a range of 8.5 to 11.5. For example, "approximately the same" means that one of ordinary skill in the art considers the items being compared to be the same. In the present disclosure, numeric ranges are inclusive of the numbers defining the range. Each smaller range between any stated value or intervening value in a stated range and any other stated or intervening value in that stated range is also disclosed. Where a stated range includes limits, ranges excluding either or both of those included limits are also included in the present disclosure.

As used herein, the terms "a," "an," and "the" include both singular and plural referents, unless the context clearly dictates otherwise. Thus, for example, "a fluid" includes one fluid and plural fluids. Unless otherwise indicated, the terms "first", "second", "third", and other ordinal numbers are used herein to distinguish different elements of the present systems and methods, and are not intended to supply a numerical limit. Reference to first and second layers should not be interpreted to mean that the component only has two layers. A component having first and second elements can also include a third, a fourth, a fifth, and so on, unless otherwise indicated.

Generally, it is understood that the drawings and the various elements depicted therein are not drawn to scale. Further, relative terms, such as "above," "below," "top," "bottom," "upper," "lower," "left," "right," "vertical" and "horizontal," are used to describe the various elements' relationships to one another, as may be illustrated in the accompanying drawings. It is understood that these relative terms are intended to encompass different orientations of the apparatus and/or elements in addition to the orientation depicted in the drawings. For example, if a capillary processing module were inverted with respect to the view in the drawings, an element described as "above" another element, for example, would now be "below" that element. Likewise, if the device were rotated 90 degrees with respect to the view in the drawings, an element described as "vertical," for example, would now be "horizontal."

As used herein, a "slide" refers to any sample holder, support or substrate having at least one substantially flat surface for a biological or chemical sample. The slide can be a carrier, microscope slide, test tube, chip, array, or disk that can support at least one sample. A slide typically has first and second major slide surfaces. The major slide surfaces typically have a long axis and a short axis, such as the long and short axis of a rectangular shape.

A sample may be disposed on a slide in various ways. In some embodiments, the sample is a biological sample such as a layer or slice of tissue or cells. Frequently, the sample will be a tissue section or cell smear or pellet for histological analysis. A tissue or other sample may be preserved in formaldehyde or in an embedding medium such as paraffin. Samples in paraffin or other embedding medium may be subjected to steps such as deparaffinization, by which paraffin or other embedding medium overlaying and/or infiltrating the sample is removed.

The present methods and systems can employ a coverslip, such as a coverslip tape, wherein the tape is the coverslip for the sample. The term "tape" as used herein encompasses tapes, strips, bands, patches, and other relatively flat forms. Desirable adhesives for use in coverslipping a tissue section are those which provide sufficient strong adherence to a sample and a slide.

As used herein, "automated" means a plurality of steps that are substantially executed by mechanical devices, computers and/or electronic controls or signals, though it does not exclude some human intervention steps such as manually replacing one of the described features or steps. As used herein, an automated coverslipping system can also include an automated solvent exchange system or other automated apparatus performing one or more steps of sample preparation.

DESCRIPTION OF THE ILLUSTRATED EMBODIMENTS

The present disclosure provides improved methods and systems for preparing a covered specimen slide.

In some embodiments, a coverslip tape is provided or wound on a first reel, and the coverslip tape extends or unwinds from the first reel across a coverslipping area to a second reel. The coverslip tape can be advanced across the coverslipping area (such as by unwinding a portion from the first reel and winding a portion on the second reel) after a first section of the coverslip tape is applied to an area of the slide. In this manner, a second section of the coverslip tape can be positioned over a subsequent slide.

In some embodiments, the present disclosure relates to a coverslipping system 100 comprising the following elements: an optional slide carrier module 200, an optional solvent exchange module 500, and a coverslipping module 400 that dispenses coverslip such as a coverslip tape, applies it to the sample and the slide, and presses it firmly in place.

Figure 2:
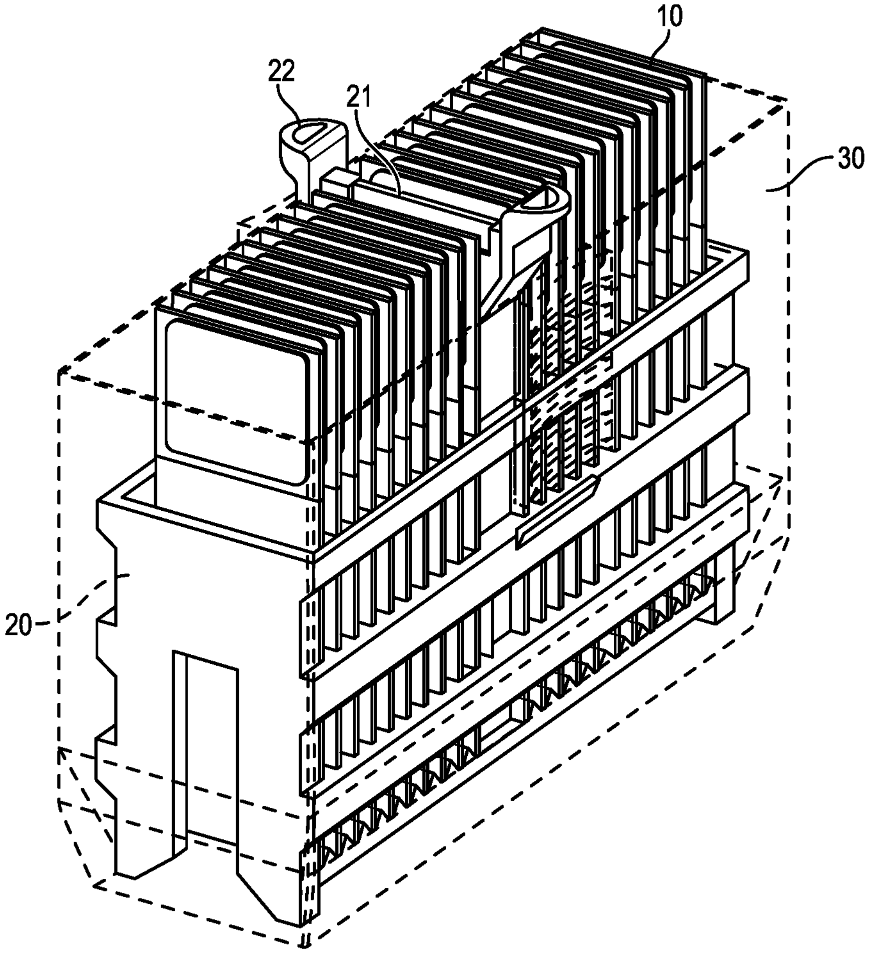
FIG. 2 shows an embodiment of a slide carrier.
Figure 3A:
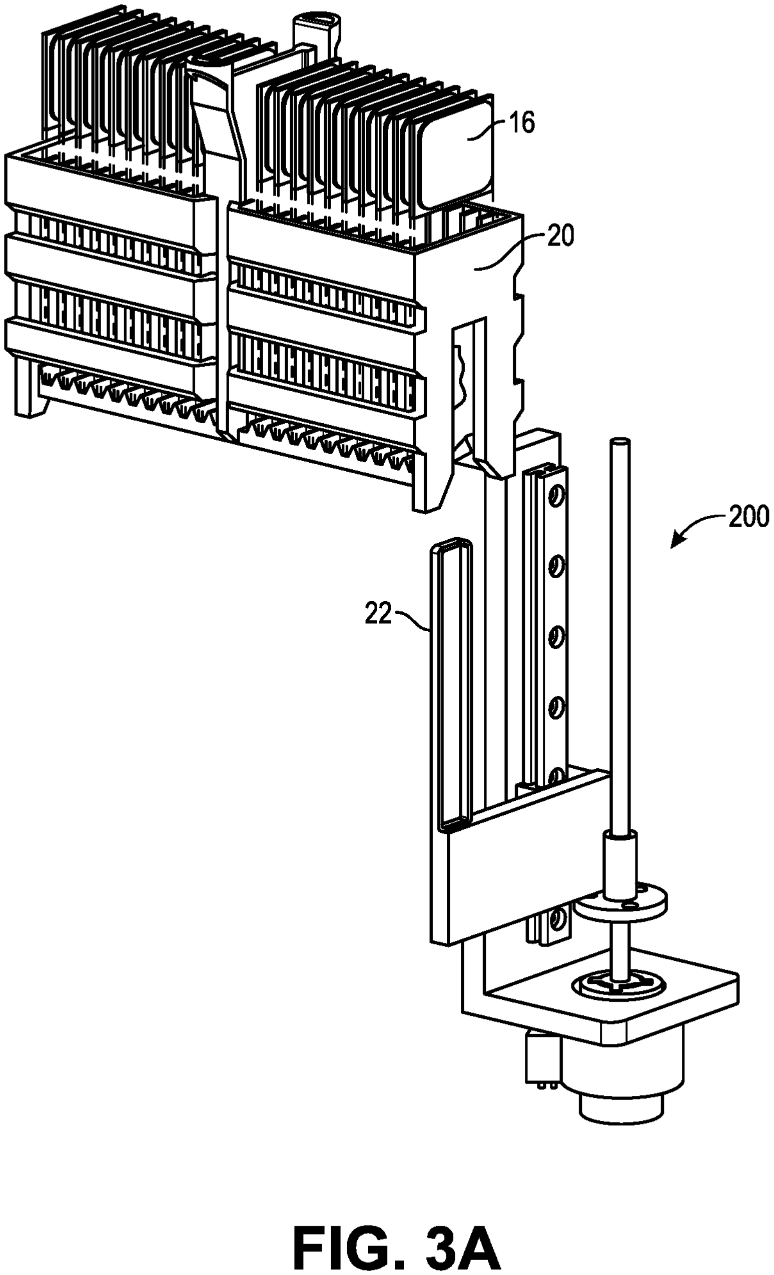
FIGS. 3A and 3B show an exemplary embodiment of a slide carrier module.
Figure 3B:
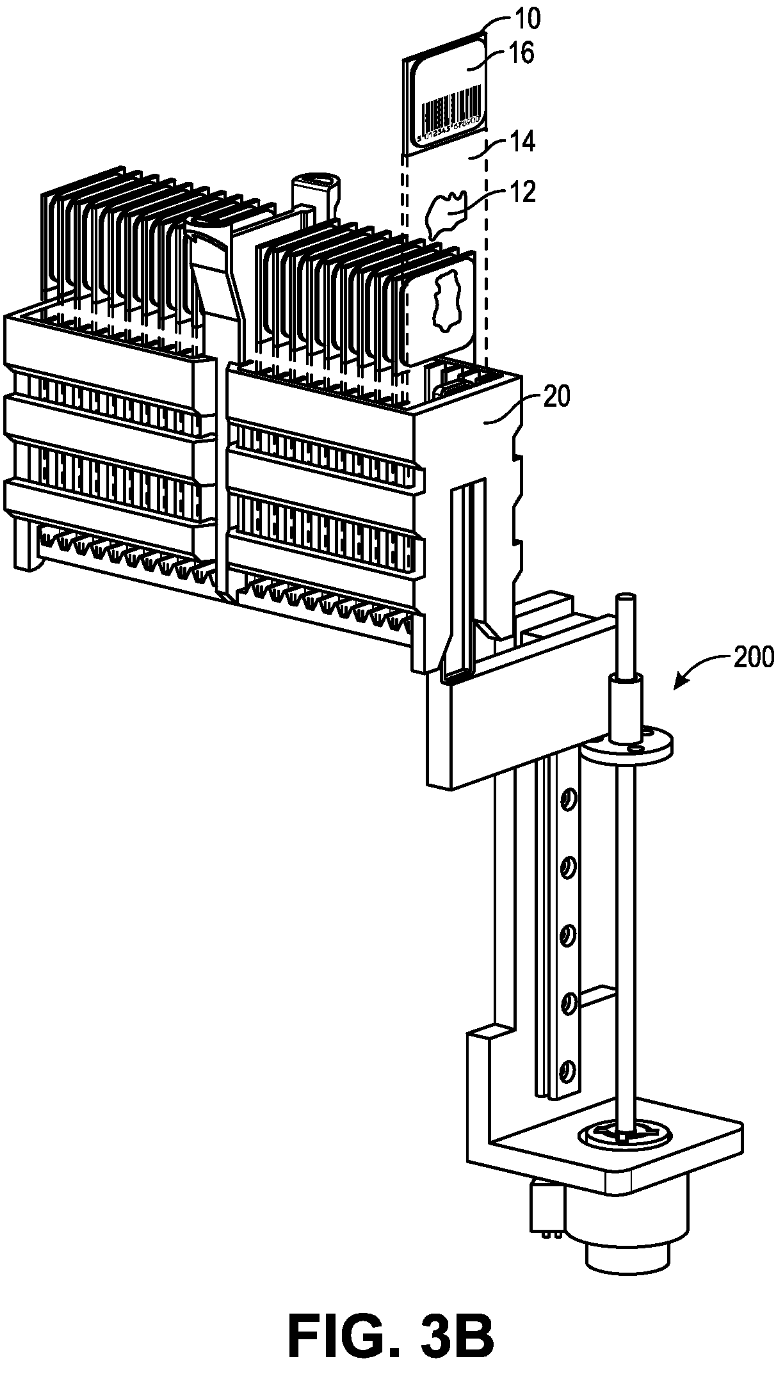

An exemplary general process for coverslipping slides is shown in FIG. 1. In a set up subprocess or area, a user loads slides 10 having samples disposed on them into a slide carrier 20. A user provides the slides 10 in the slide carrier 20 which can then be immersed in a solvent tank 30. Samples 12 such as tissue sections are disposed on the slides 10. Slides 10 can include a sample region 14 and a slide barcode 16. In one embodiment the solvent tank contains input solvent that is water. An example of a slide carrier is illustrated in FIG. 2. The slide carrier 20 can be immersed in a solvent tank 30. A slide carrier handle 21 can be integral with the slide carrier 20 or can lock on and off the slide carrier 20. The slide carrier handle 21 facilitates immersion and removal of the slide carrier 20 from solvent tank. The slide carrier handle 21 can include flanges 22 which can be engaged by a robotic arm that moves the slide carrier. The slides 10 can be immersed in the solvent tank 30 for one or more purposes, such as removal of an embedding medium, or to remove a solvent from the sample, or to apply a new solvent to the sample. In some embodiments, the solvent tank 30 comprises a prewet solvent suitable as a mounting medium. In other embodiments, the solvent tank 30 comprises an input solvent for a purpose other than mounting, such as an assay solvent or water, and the input solvent can subsequently be exchanged with a prewet solvent. After a desired period, the slide carrier 20 is removed from the solvent tank 30, placed in a slide carrier module 200 and moved to a coverslipping module. During the set-up, the user also enters a protocol for coverslipping, such as the length of coverslip tape to be applied to the slides 10. FIGS. 3A and 3B show the slide carrier module 200 removing the slide carrier 20 from the solvent tank and sequentially transfers each slide 10, to the coverslipping module 400. The slides 10 are held vertically in the slide carrier module 200. A slide remover is sized so that it can engage the short edge of a single slide 10 and push it upward and out of the slide carrier 20. It will be appreciated that one or more of the foregoing portions of the procedure may be automated rather than performed by a user.

In a coverslipping subprocess or area, slides 10 are removed from slide carrier 20 and transferred to a support for processing. The support may be part of a solvent exchange module and/or a coverslipping module, which are described in more detail below. In some embodiments, the slides 10 undergo solvent exchange before a coverslip tape is applied. In other embodiments, the slides 10 are already suitable for coverslipping. After a coverslip is applied to a slide, the coverslipped slide will be placed in a slide carrier 20 (which may be the same slide carrier or a different one as earlier). It will be appreciated that one or more of the foregoing portions of the procedure may be automated or performed by a user.

FIGS. 4A to 4E show an exemplary embodiment of a coverslipping module 400. A slide is positioned on a slide mount table 402 in the coverslipping module 400, as shown in FIGS. 4 and 5A. Generally, the slide will be positioned such that its long axis is aligned with a direction in which the slide mount table 402 moves, and/or a direction in which a coverslip tape dispenser moves with respect to the slide mount table. The slide mount table 402 can be moved by manual or automated action. For example, the slide mount table 402 can be attached to a linear stage 403 that provides automated linear motion. In some embodiments, the slide is positioned such that its long axis is aligned with the direction in which a coverslip tape is unwound from a reel. Coverslipping module 400 includes a coverslip tape dispenser assembly 404, which comprises a reel 406 on which a source of coverslip tape is wound. A release liner motor rolls the release liner on the release liner assembly 408, drawing the source tape 410 in the source tape assembly 416 through the coverslip tape dispenser assembly 418. The release liner 412 passes through an extrusion slot 420 and is separated from the released tape 414 that passes over the extrusion guide 422. When the released tape triggers the position sensor 424, the release liner motor is deactivated.

In some embodiments, the present systems comprise a laminator assembly 430 to apply pressure to and laminate a coverslip tape on a slide. The laminator assembly 430 can include a laminator roller 434 that rolls the coverslip tape in a horizontal direction at a desired or predetermined pressure and/or speed. The laminator assembly 430 can also include a laminator actuator 432 to vertically move the laminator roller 434 with respect to the slide mount table 402 and/or to increase or decrease the pressure applied to the coverslip tape 414. In some embodiments, the slide mount table 402 is configured for horizontal movement along the long axis of the slide 10. Such movement can be provided by a stage. As shown in the exemplary embodiments of FIGS. 4C to 4E, the slide mount table 402 is moved to the laminator start position 436 and the laminator actuator 432 presses the released tape 414 on the slide 10 using the laminator roller 434 once it is positioned by the laminator actuator 432. After a sufficient length of the coverslip tape 414 is applied to the slide 10, the applied coverslip tape may be cut from the source tape. As illustrated in the exemplary embodiment of FIG. 4D, a knife actuator 442 extends a knife 444 through the cut slot 446 so that the released tape 414 is cut to the appropriate length. The linear stage moves from laminator start position 436 to laminator end position 438 at a controlled rate to press the released coverslip tape 414 onto the slide 10.

The coverslipping module 400 is configured such that the laminator roller 434 is coplanar to the slide. The laminator force and lamination speed are also controlled by the coverslipping module 400. In some embodiments, a roller laminator force of 10 to 300 Newtons/inch, or a force of 150-250 Newtons/inch of roller contacting the slide has been found to be suitable. In some embodiments, a laminator roller having a Shore durometer hardness from 10 to 80 and particularly 20 to 30 have been useful as determined by ASTM D2240 type A or type D scale. In some embodiments, lamination speeds of 0.01 to 10 mm/second and particularly 0.1 to 0.5 mm/second have been useful. Lamination of the coverslip tape to the slide can occur in multiple passes, as the slide mount table is moved multiple times between a laminator start position and a laminator end position; In some embodiments, it has been found that 1 to 10 lamination passes, or 2 to 4 lamination passes, are suitable.

After lamination is completed, the laminator actuator 432 withdraws the laminator roller 434 and the linear stage 403 moves the slide mount table to an unload position. The slide carrier module transfers the slide to a slide carrier, usually an output slide carrier.

Figure 5:
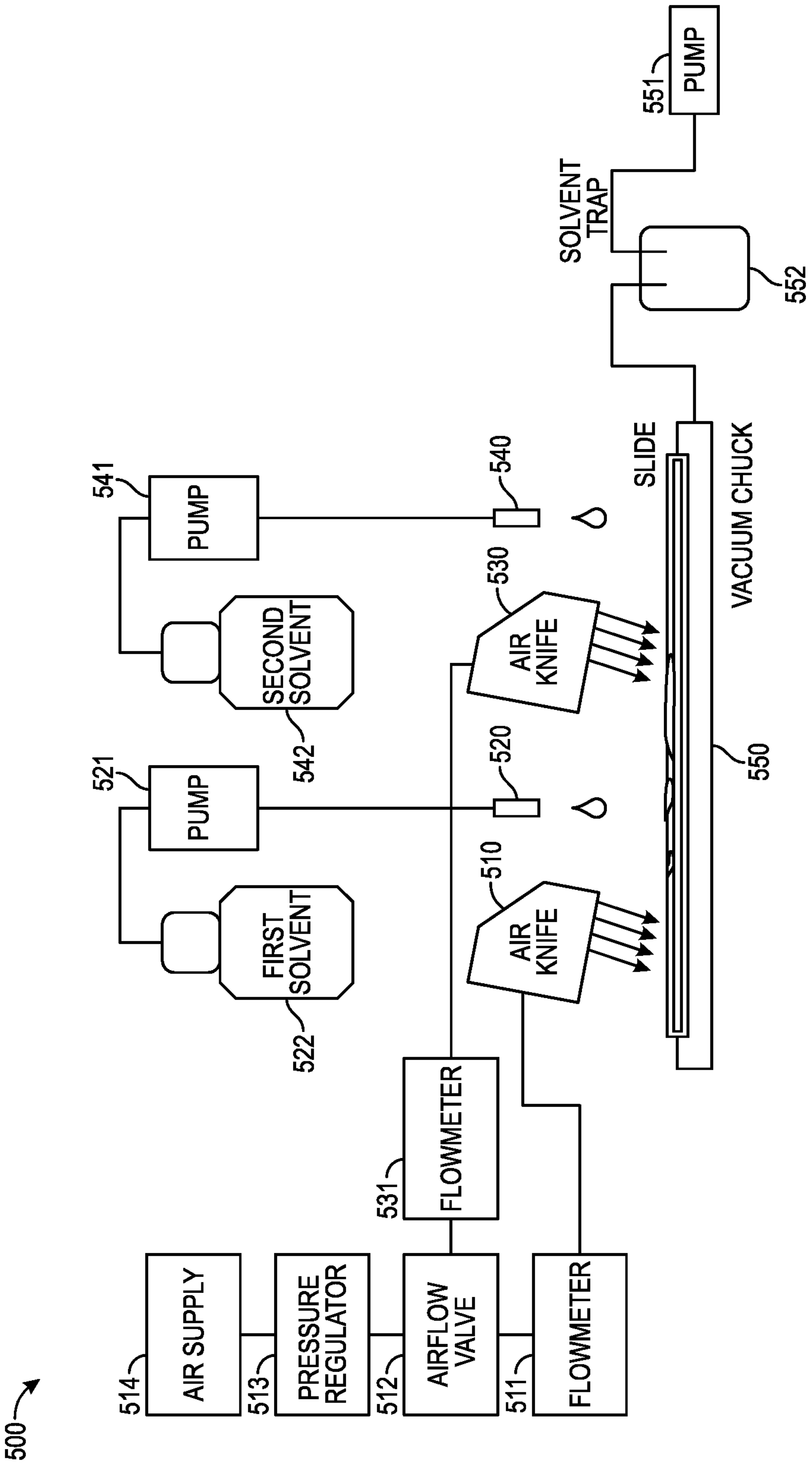
FIG. 5 shows an exemplary embodiment of a solvent exchange module.

In some embodiments of the present methods, it may be desirable to exchange a solvent on the sample before applying the coverslip tape, and FIG. 5 illustrates an exemplary novel solvent exchange module 500 for solvent exchange (that is, removing a solvent that is undesirable in the present coverslipping methods and applying a desired solvent). For instance, the undesirable solvent may be an input solvent used to apply a dye to a sample, and the prewet solvent may be selected as compatible with a mounting medium. Conventional approaches use xylene as the prewet solvent, but as noted above, xylene is not desirable. Other useful prewet solvents include water, hexane, ethanol, isopropyl alcohol, Clearify™ and other solvents. Also, mixtures of these solvents have been useful, as well as the addition of surfactants and other substances to enhance wetting, including propylene glycol. If the input solvent (which may be the solvent used in solvent tank for processing the samples) is not appropriate as a prewet solvent, the solvent exchange module 500 can be included in the present system, providing a process path for changing the input solvent to the prewet solvent. It may be useful to sequentially use one or several intermediate solvents to ensure reproducible and complete solvent exchange.

In the exemplary embodiment, as illustrated in FIG. 5, slide 10 is disposed on a support which in this instance is a solvent return 550 (such as a vacuum chuck) which collects solvent that is removed from the slide 10. To provide suction, vacuum chuck or other solvent return 550 can be connected to a solvent return pump 551 through a solvent trap 552. Vacuum chuck 550 can be disposed on or integral with a slide mount table. In FIG. 5, the slide mount table moves from the first air knife 510, to the first dispenser 520 that dispenses first solvent from first solvent source 522, the second air knife 530 and the second dispenser 540 that dispenses second solvent from second solvent source 542. First and second air knives 510, 530 are fluidically connected to flowmeters 511, 531 which control, determine or measure the gas supplied to air knives 510, 530. Flowmeters 511, 531 receive air or other gas from an air supply 514 or other gas source, which may be connected to air knives 510, 530 directly or through one or more other devices, such as a pressure regulator 513, airflow valve 512, and the flowmeters 511, 531.

In one embodiment of the present methods, the input solvent on the slide is water, and it is passed through the solvent exchange module 500 which uses an alcohol solvent. The alcohol solvent can be an ethanol-containing solvent, for example, 100% ethanol, or an aqueous solution containing at least 92% ethanol or at least 96% ethanol. In some embodiments, only the first solvent source 522, the first air knife 510 and first dispenser 520 are used, and the alcohol solvent serves as the prewet solvent. It is also contemplated that additional air knives, dispensers, and solvents could be added to the solvent exchange module. The solvent dispensers can be sprayers, brushes, stamps, or drip tubes with a range of shapes as known to those skilled in the art.

Figure 6:
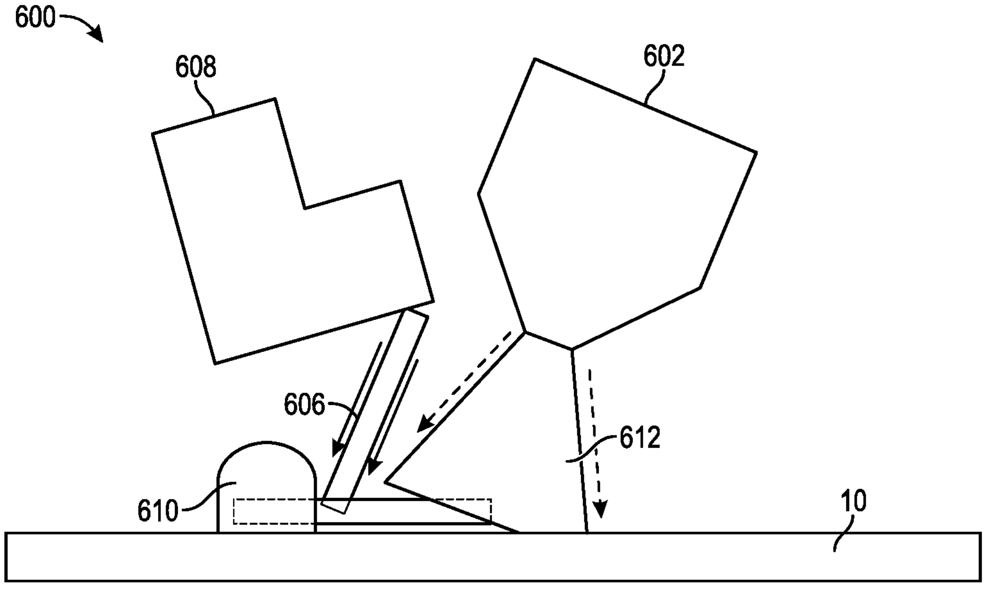
FIG. 6 shows another exemplary embodiment of a solvent exchange module.

FIG. 6 illustrates another exemplary embodiment of a solvent exchange module 600 in which a sprayer 602 is used as the first dispenser. A slide 10 is disposed on a support 604, and air stream 606 is directed at a leading end of slide 10 by first air knife 608, causing input solvent 610 to accumulate at a trailing end of slide 10. Sprayer 602 sprays a prewet solvent 612 onto the leading end of slide 10 as it is moved from left to right by vacuum chuck in the support 604.

Figure 7A:
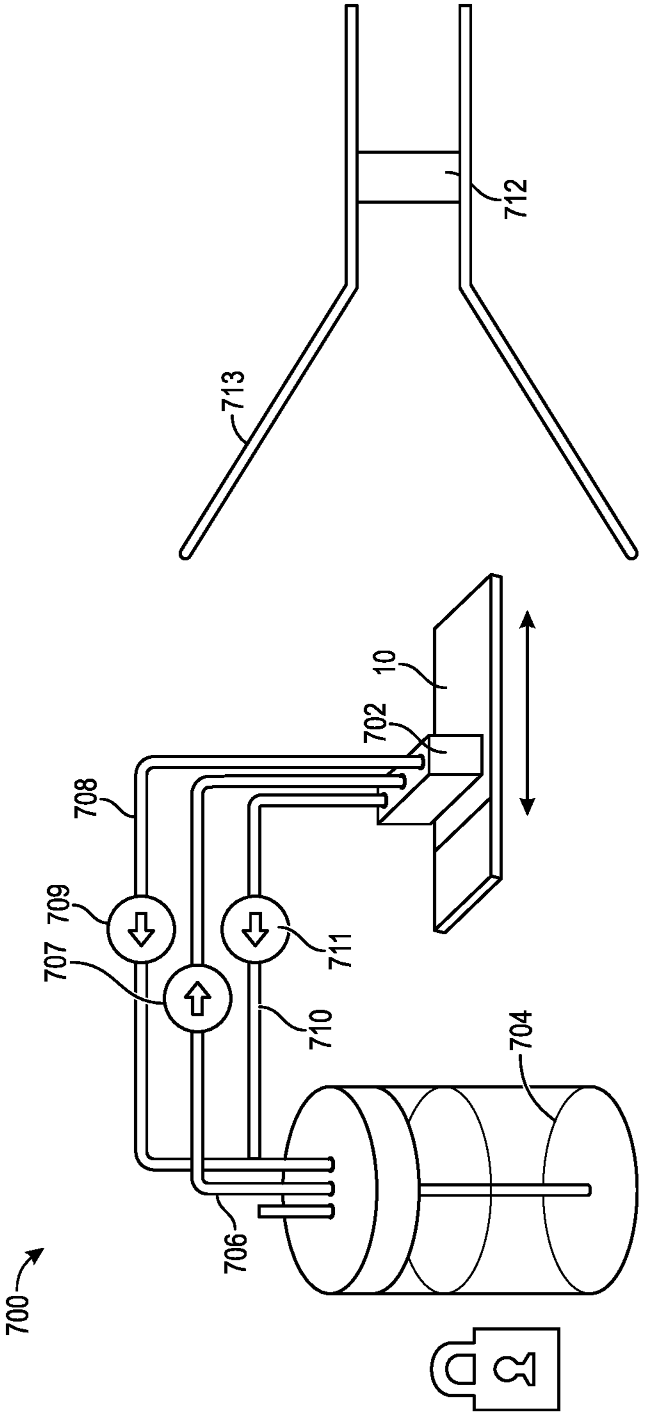
FIGS. 7A and 7B show another exemplary embodiment of a solvent exchange module.

FIG. 7A shows another embodiment of a solvent exchange module 700 in which a solvent exchange head dispenses an exchange liquid and removes water or other undesired solvent from the sample. Capillary forces keep the dispensed exchange liquid in a capillary gap formed by the slide and the solvent exchange head, and prevent the solvents from leading or dripping off the slide. In the embodiment shown in FIG. 7A, a capillary gap is formed between a slide 10 and a solvent exchange head 702. The solvent exchange head 702 comprises at least one dispensing hole and at least one draining hole, through which an exchange liquid can be dispensed on a slide 10, and a drained liquid can be removed from a slide. The solvent exchange module 700 is configured to position the solvent exchange head 702 at a distance from the slide 10, wherein the distance is sufficiently small to create a capillary gap between the slide and a solvent exchange surface of the solvent exchange head 702. For example, the distance can be less than 1600 μm, or less than 800 μm, or less than 400 μm, or less than 200 μm, or less than 100 μm, or less than 50 μm. In some embodiments, the solvent exchange head 702 comprises a dispensing hole in the middle of the solvent exchange head, and two draining holes, one at each end of the solvent exchange head near the edge of the slide. In some embodiments, the draining hole(s) are larger than the dispensing hole(s), so that the exchange solvent is kept below the solvent exchange head. The solvent exchange head 702 can be moved along the slide 10, in one direction or back and forth, one or more times, so that the exchange liquid flows over substantially all of the sample and staining area of the slide. For example, the solvent exchange head can move past the sample at least 1, 2, 3, 4, 5 or more times. Movement back and forth several times can increase efficiency of the solvent exchange. The rate of liquid flow through the dispensing hole and draining hole(s) should be selected to provide laminar flow of liquids in the capillary gap. For example, in some embodiments, the flow rate through the drain hole(s) can be >2.6 mL/s (or >1.3 mL/s through each of two draining holes) when the flow rate through the dispensing hole is <2.4 mL/s. The flow rates can be set by pumps connected to dispense and return lines. To maximize staining area, head should be capable of moving to slide edges, but not extend beyond edges to prevent leak.

An exchange liquid comprising an exchange solvent (such as ethanol) is dispensed onto the slide 10 from the dispense line 706 from a reservoir 704, and a drained liquid is removed from the slide and returned to reservoir 704 through return lines 708, 710. The flows of liquids through the dispense line 706 and the return lines 708, 710 are provided by pumps 707, 709, 711. The exchange solvent is kept below the solvent exchange head 702 by capillary forces, and the apparatus design limits leaking or wicking from slide top surface. The amount of exchange solvent left on the slide can be controlled during the slide's final pass below the solvent exchange head 702, which leads to more consistent results in the coverslipping of the slide. In some embodiments, gases from an exchange solvent such as ethanol are collected, such as by using a fume hood 713 having a coal filter 712, to keep gasses below desired levels and ensure safety. A significant proportion of the exchange solvent passes across the slide 10 and is removed along with the undesirable solvent through the draining hole, then returned to the reservoir 704. As a result, the exchange liquid in the reservoir becomes diluted as more slides are processed by the solvent exchange head 702, and eventually the exchange liquid in the reservoir 704 must be replenished by user. For example, the exchange liquid in the reservoir may initially have a concentration of 96% v/v of an exchange solvent such as ethanol, and a user may replace or replenish the reservoir when the concentration of the exchange solvent reaches 90% v/v or another predetermined limit. To reduce water diluting the exchange solvent in the reservoir 704, a user may perform additional steps to remove water on the slide prior to the present solvent exchange method being used.

Figure 7B:
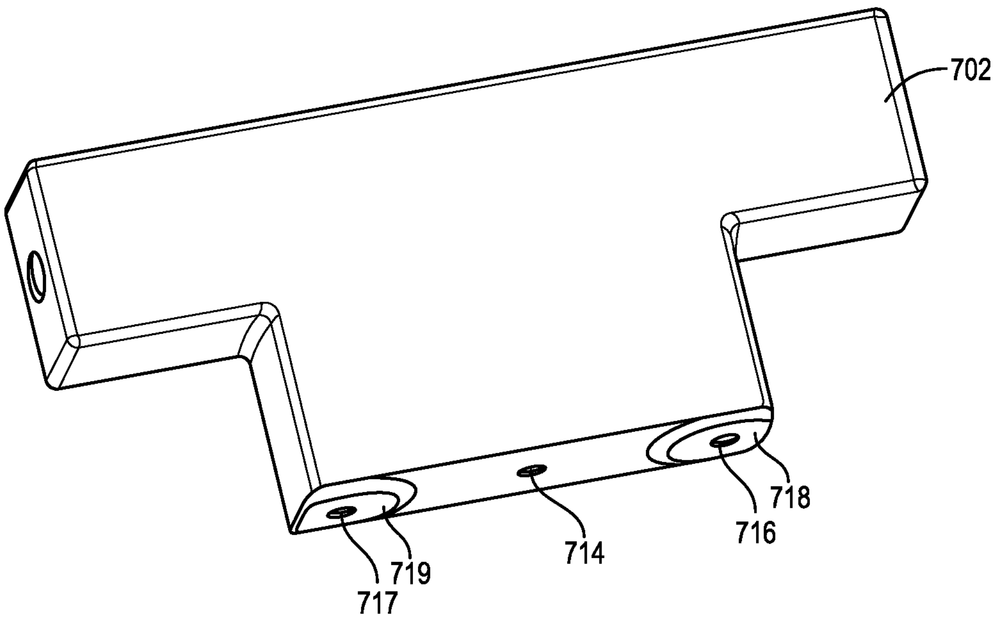

FIG. 7B illustrates the solvent exchange head 702 in the apparatus of FIG. 7A. In some embodiments, the solvent exchange head 702 has a width that is substantially the same as a width of a slide. The solvent exchange head 702 has one central dispensing hole 714 and two draining holes 716, 717 to reduce flow resistance into capillary gap, and to reduce time to exchange volume below head. However, suitable solvent exchange heads can comprise any desired number of dispensing holes and draining holes, for example 1, 2, 3, 4, 5, 6 or more. The flow of the exchange liquid and the removed liquid can be controlled by one or more pumps. In some embodiments, the solvent exchange module comprises a separate pump for each of the dispense lines and the return lines; alternatively, in some embodiments, the module comprises one for the dispense lines, and one pump for the return lines. In FIG. 7B, draining holes 716, 717 are positioned in an area having a smaller capillary gap than the area around the dispensing hole 714, such as by having a raised surface 718, 719 around the draining holes.

Figure 8:
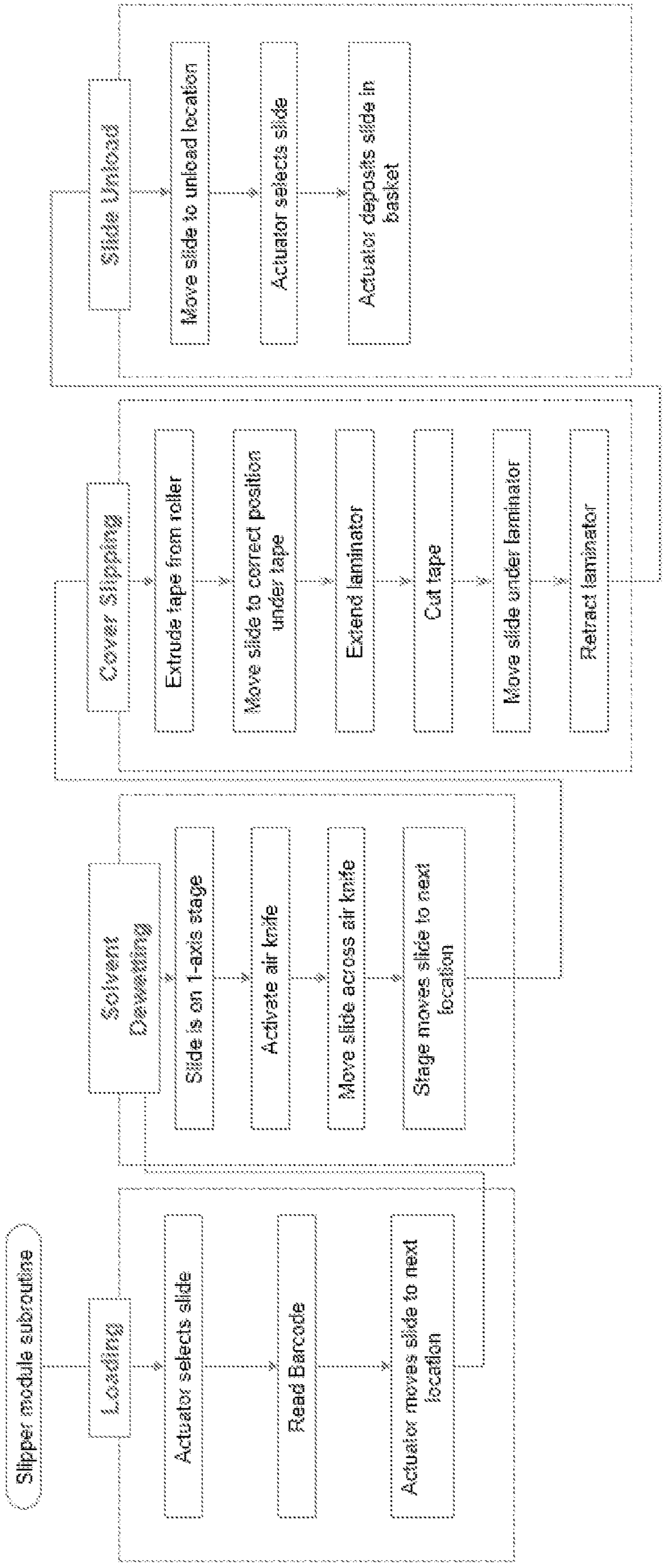
FIG. 8 shows an exemplary embodiment of a coverslipping protocol.

FIG. 8 illustrates an exemplary embodiment of an overall instrument protocol for preparing a covered sample slide that implements the slide loading, solvent exchange, coverslipping, and slide unloading activities and modules which have been described above. More generally, FIG. 8 illustrates various embodiments of the present method of preparing a covered sample slide. One or more subroutines comprising instructions for processing the slides are entered into a controller. Slides having samples are provided in a slide carrier which is loaded into an instrument comprising a solvent exchange module and a coverslipping module. An actuator selects a slide from the slide carrier. A barcode reader in the instrument identifies the slide and the identification is communicated to the controller, which in turn provides a signal that directs the slide to a location for processing. If the instructions for that slide require solvent removal, the slide is moved to a solvent removal module, such as a module according to FIG. 5, 6 or FIG. 7A. The slide is placed on a support such as a stage or conveyer that moves the slide along one axis, preferably along its long axis. An air knife is activated to remove the input solvent on the slide. In some embodiments, the module also includes a solvent dispenser to apply a solvent, such as a prewet solvent. The slide can be moved to a coverslipping module. In some embodiments, the same support (such as a stage) moves from the solvent exchange module to the coverslipping module. Coverslip tape is extruded from a dispenser assembly, and the stage positions the slide such that a trailing end of the slide is under a leading end of the coverslip tape. The stage and/or the dispenser assembly move linearly in the direction of the long axis of the slide (which preferably be substantially the same as the direction of extruding the coverslip tape). A laminator assembly extends a laminator (such as a roller). The coverslip tape is cut at a suitable length to cover the sample on the slide. The laminator applies pressure to the coverslip tape, causing it to adhere to the slide. The laminator assembly retracts the laminator. The stage then moves the slide to an unloading location, where an actuator removes the slide and places it in an output slide carrier.

Figure 9:
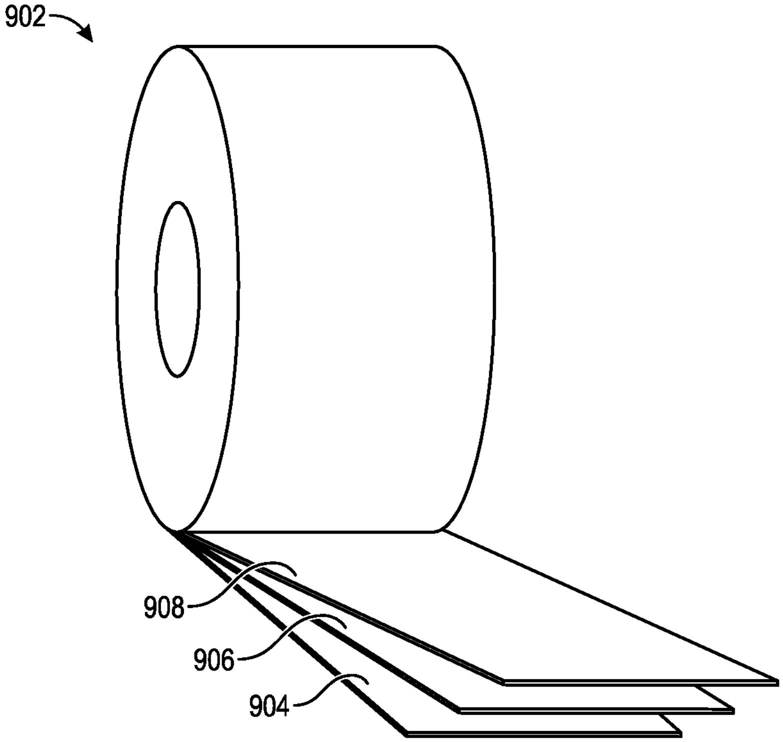
FIGS. 9, 10, 11A, 11B, 12 and 13 show exemplary embodiments of coverslip strips and dispensers.

The clean coverslip tape can be provided for use in the present systems and methods in any form. In some embodiments, the clean coverslip tape is provided as a coverslipping source tape, which has one or more features to keep the coverslip tape clean and/or facilitate its application to a slide. An exemplary configuration of a coverslip source tape 902 is shown in FIG. 9. The coverslip source tape 902 generally comprises a backing layer 904 and an adhesive layer 906. In some configurations the coverslip source tape 902 also comprises a release layer 908. A release layer 908 is particularly desirable when the coverslip source tape 902 is provided by winding it on a reel.

In some embodiments, the coverslip source tape comprises kiss cut portions, which include light cuts within the border of the portion to be used as a coverslip tape. When coverslips are created with kiss cuts, they can be peeled from the backing. Multiple kiss cut portions can be linearly positioned on a strip such as a release layer.

Figure 10:
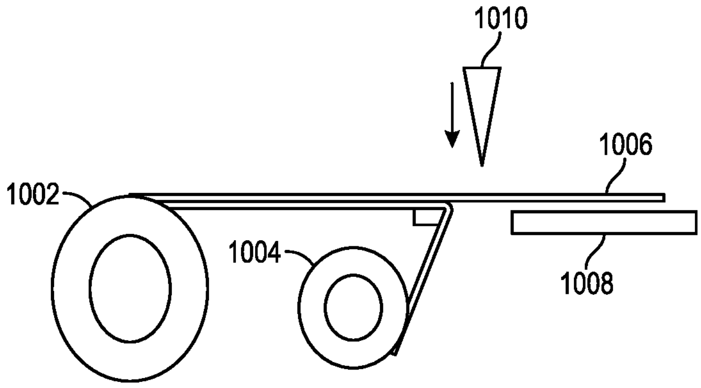
Figure 11A:
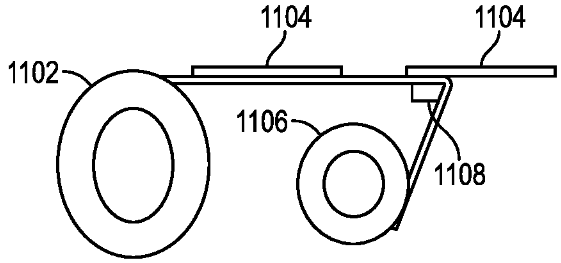
Figure 11B:
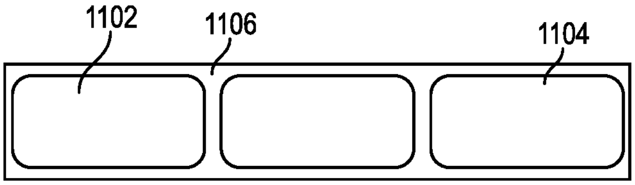
Figure 12:
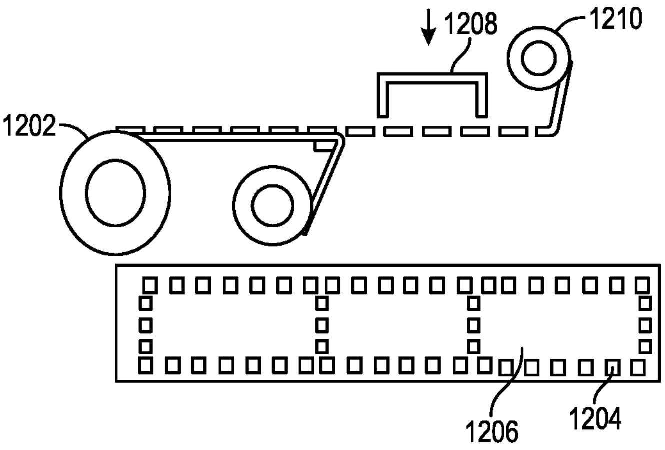
Figure 13:
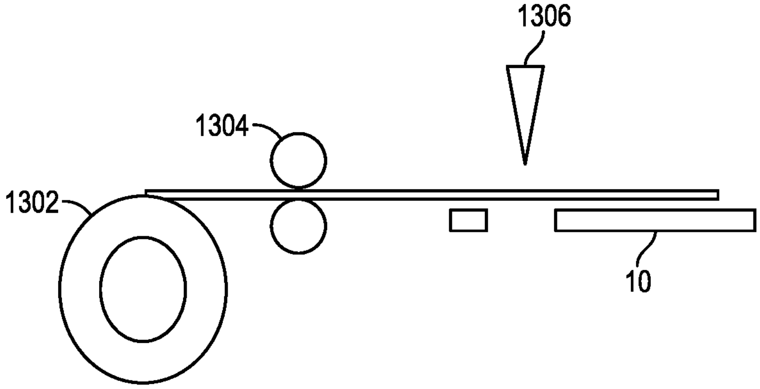

FIGS. 10, 11A and 11B, 12 and 13 illustrate various coverslip source tape exemplary embodiments which may be advantageous. In FIG. 10, the coverslip source tape 1002 includes a release liner 1004 which is pulled through the tape dispenser assembly, the released tape 1006 is extruded over the guide surface 1008, and cut with a knife 1010. In FIGS. 11A and 11B, a kiss cut source tape 1102 consists of a set of kiss cut coverslips 1104 provided on continuous release liner 1106 as a series of kiss-cut regions with optically clear backing and a pressure-sensitive adhesive. The kiss cut coverslip source tape 1102 has been prepared so that a series of kiss cut coverslips 1104 are uniformed positioned along the length of the release liner 1106. The tape dispenser assembly 1108 extrudes each kiss cut coverslip as shown on the right using a position sensor for movement control. In FIG. 12, a frame cut coverslip source tape 1202 has perforations 1204 to define the coverslip 1206, and uses the tape reel to advance the tape over the slide. An annular punch 1208 releases the frame cut coverslip 1206 and attaches it to the slide. The remaining portions of the tape (after the perforated coverslips are released) can be collected on a tape reel 1210. In FIG. 13, the coverslip source tape 1302 does not have a release liner. A tape drive mechanism 1304 extrudes each length of tape that is cut by a knife 1306 and applied to each slide 10. Other components which are described above, such as a barcode reader, an air knife, a coverslip tape dispenser, a laminator, and a coverslip tape cutter or knife.

Figure 15:
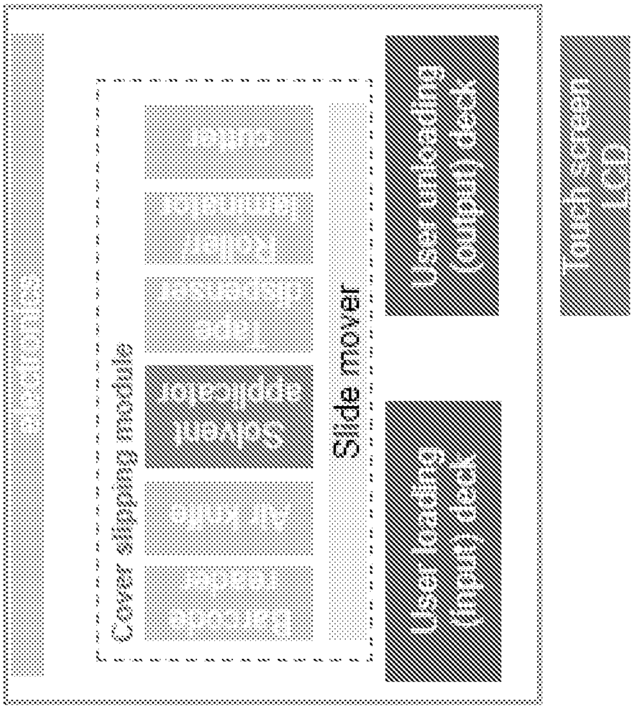
FIGS. 14 and 15 illustrate exemplary embodiments of system architecture for a coverslipping system as described herein.
Figure 14:
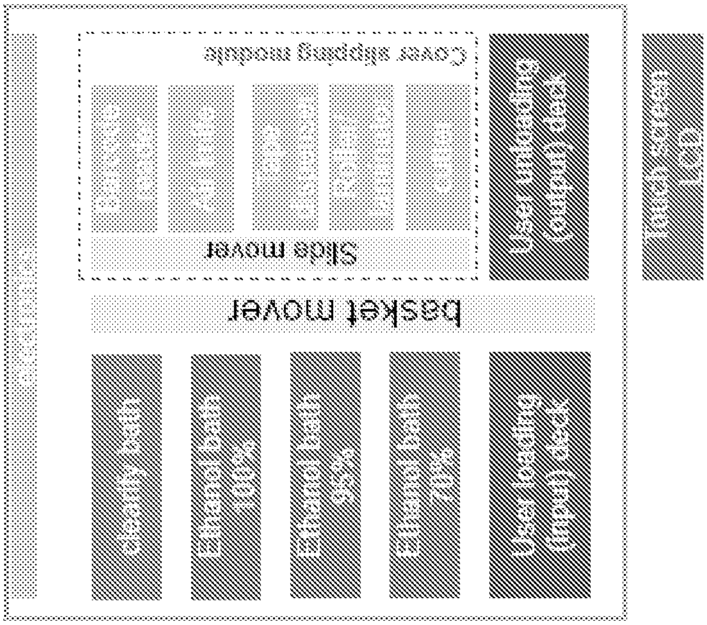

In some conventional approaches to slide processing, slides in water are immersed in a series of alcohol baths to ensure dehydration before immersion in a xylene bath. Accordingly, in some exemplary embodiments of the present systems, as illustrated in FIG. 14, an automated basket mover moves a slide carrier between a series of slide baths or tanks, such as slide baths comprising 70% ethanol, 95% ethanol, 100% ethanol and Clearify™. FIG. 14 also illustrates placement within an embodiment of a slide preparation system as described herein. In a second configuration of a slide preparation system, shown in FIG. 15, a slide mount table moves the slide between an air knife and a solvent dispenser.

In some embodiments, the present systems comprise a storage unit for slide carriers. For instance, the systems may comprise input and output storage for one, two three, four, five or more slide carriers. In some embodiments, the present systems are employed to retrieve a slide from a slide carrier, process the slide as desired, and return the slide to the same slide carrier. By way of example, the processing can an comprise first performing solvent exchange, then coverslipping, then returning the slide to the slide carrier from which it was retrieved. This simplifies the instrument, since there is no need for a new slide carrier to receive slides which have been processed, thus resulting in less handling of slide carriers and reducing basket handling inside the instrument. For example, in some embodiments, baskets are loaded in water and removed from the water when slide processing starts. In some embodiments, slide processing may be completed in a time which reduces or eliminates artefacts resulting from drying of the tissue samples. For example, in some embodiments, slide processing is completed in about 15 seconds, allowing a basket with 20 slides to be processed in 5 minutes, thereby reducing or eliminating artefacts resulting from drying of the tissue samples since the longest time that a slide would be out of the water is 4 minutes 45 seconds. In some embodiments, the solvent exchange process is completed in about 5 seconds or less. In some embodiments, the coverslipping process is completed in about 5 seconds or less. In some embodiments, the process of returning the slide to the slide carrier is completed in about 5 seconds or less.

In some embodiments, the present systems may be used for automated coverslipping of slides that have been subjected to an assay other than an immunohistochemistry assay, such as in situ hybridization. In such embodiments, the systems include an option to dryload a slide carrier, and a dispenser to apply a mounting medium for the assay (for example, a FISH mounting medium) instead of applying an exchange solvent.

Materials

In some embodiments, the coverslip tape can be prepared from a material like 3M™ Microfluidic Diagnostic Tape 9795R or other clear adhesive tape. In some embodiments, the coverslip tape is single-sided (that is, only one side has adhesive disposed on it). In some embodiments, the coverslip tape comprises a delayed-tack adhesive. The coverslip tape can have a thickness of 50 microns to 500 microns, and preferably 100 microns to 300 microns. The thickness of the adhesive can be 5 microns to 200 microns and preferably 15 microns to 30 microns.

The coverslip tape comprises a pressure sensitive adhesive, which, in some embodiments, can be selected from several silicone- and acrylic-based formulations. Transparent and optically-clear backing materials and adhesives are currently manufactured for consumer electronics displays and other applications by companies including 3M Company of Maplewood, Minnesota, Polymer Science, Inc. of Monticello, Indiana, and Adhesives Research, Inc. of Glen Rock, Pennsylvania Examples of suitable adhesives include low-tack pressure-sensitive adhesives such as acrylonitrile copolymers ((e.g., butadiene-acrylonitrile polymers (BACN polymers), butadiene-acrylonitrile-isoprene polymers (BACNI polymers)); styrene copolymers (e.g., styrene/butadiene/styrene (SBS polymers), styrene/isoprene/styrene (SIS polymers), and styrene/ethylene/butylene/styrene (SEBS polymers)); and acrylate copolymers. Blends and mixtures of polymeric materials may be used if desired. The pressure sensitive adhesive may also contain sufficient antioxidants, UV stabilizers and crosslinking agents.

The coverslip tape also comprises a backing which is typically an optically transparent polymeric film. Suitable polymeric film materials include cellulose diacetate, cellulose triacetate, polyethylene terephthalate, styrene-acrylonitrile, and polymethyl methacrylate films. In some embodiments, the backing is a cyclic olefin polymer or cyclic olefin copolymer. In some embodiments, the backing has a thickness of from 50 microns to 300 microns. In some embodiments, the coverslip tape can also comprise a tie layer between the polymeric film and the pressure sensitive adhesive. The selection of an appropriate tie layer material can be made based on the type of pressure sensitive adhesive and backing used. Many materials known to be useful as tie layers are useful, for example, chlorine-containing polymers like polyvinyl chloride, vinyl chloride/vinyl acetate copolymers, polyvinylidene chloride, polycarbodiimide and ethylene vinyl acetate polymers and copolymers, acid or anhydride-modified polyethylene, propylene and ethylene vinyl acetate polymers and copolymers may be used.

Parameters

In some embodiments, the refractive index of the coverslip tape as a whole, and/or of the individual components thereof, can be between 1 and 2, or 1.2 and 1.8, or 1.45 and 1.65. In some embodiments, the refractive index is selected to substantially match the refractive index of a slide.

In some embodiments, the luminous transmittance of light of the coverslip tape (determined according to ASTM D1003-95) is at least about 85% or at least 75%.

In some embodiments, the adhesive can exhibit 180° peel adhesion values from about 0.1 to about 3.0 N/25 mm width.

In some embodiments, the adhesive can exhibit a dynamic shear strength of at least about 2 $kN/m^2$, or at least about 4 $kN/m^2$.

Methods of Preparing Samples Before & After Coverslipping

The present methods can comprise additional steps before or after coverslipping to prepare the sample for analysis and/or to stabilize a sample after treatment. In general, a sample can be prepared for analysis and/or storage by any suitable technique. In some embodiments, the sample will have embedding medium removed after it is placed onto a slide. Step(s) for removing embedding medium are commonly referred to as deparaffinization, since most samples are embedded in paraffin, such as a tissue section from a FFPE block. Deparaffinization is representative of any technique of removing embedding medium from a sample on a slide. For histochemical analysis, in some embodiments, a target retrieval process is performed by contacting the sample with a suitable buffer such as IVIES buffer or citrate buffer, adjusted to high or low pH and heating to a suitable temperature (about 95° C.) or higher. This is referred to as heat-induced epitope retrieval (HIER). Alternatively, a sample can be either be subjected to proteolytic digestion by applying pepsin, proteinase K or another digestion enzyme or acid based antigen retrieval by acids such as formic acid and subsequently incubating it in order to facilitate access by assay reagents, such as antibodies. The present methods and systems can also comprise one or more processes for performing molecular analysis using in-situ hybridization (ISH) based assays on the sample before applying the coverslip tape. ISH requires denaturation of nucleic acids by heating in the presence of buffer and hybridization of fluorescent labelled nucleic acid probes for fluorescence in-situ hybridization (FISH) or application of chromogen for chromogenic in-situ hybridization (CISH). ISH samples are dried prior to application of mounting media and a coverslip.

The examples that follow illustrate the present disclosure and should not in any way be considered as limiting the present disclosure.

EXAMPLES

Example 1

In this example, a transparent tape comprising a pressure sensitive adhesive (3M9795R) was evaluated for its suitability for use as a coverslip tape. Uterus tissue was processed for formalin fixation and paraffin embedding (FFPE), cut into 5 um sections and mounted on slides. The section samples were dewaxed and stained using hematoxylin and eosin, dehydrated with ethanol, and then immersed in Clearify™ as a prewet solvent.

Figure 16:
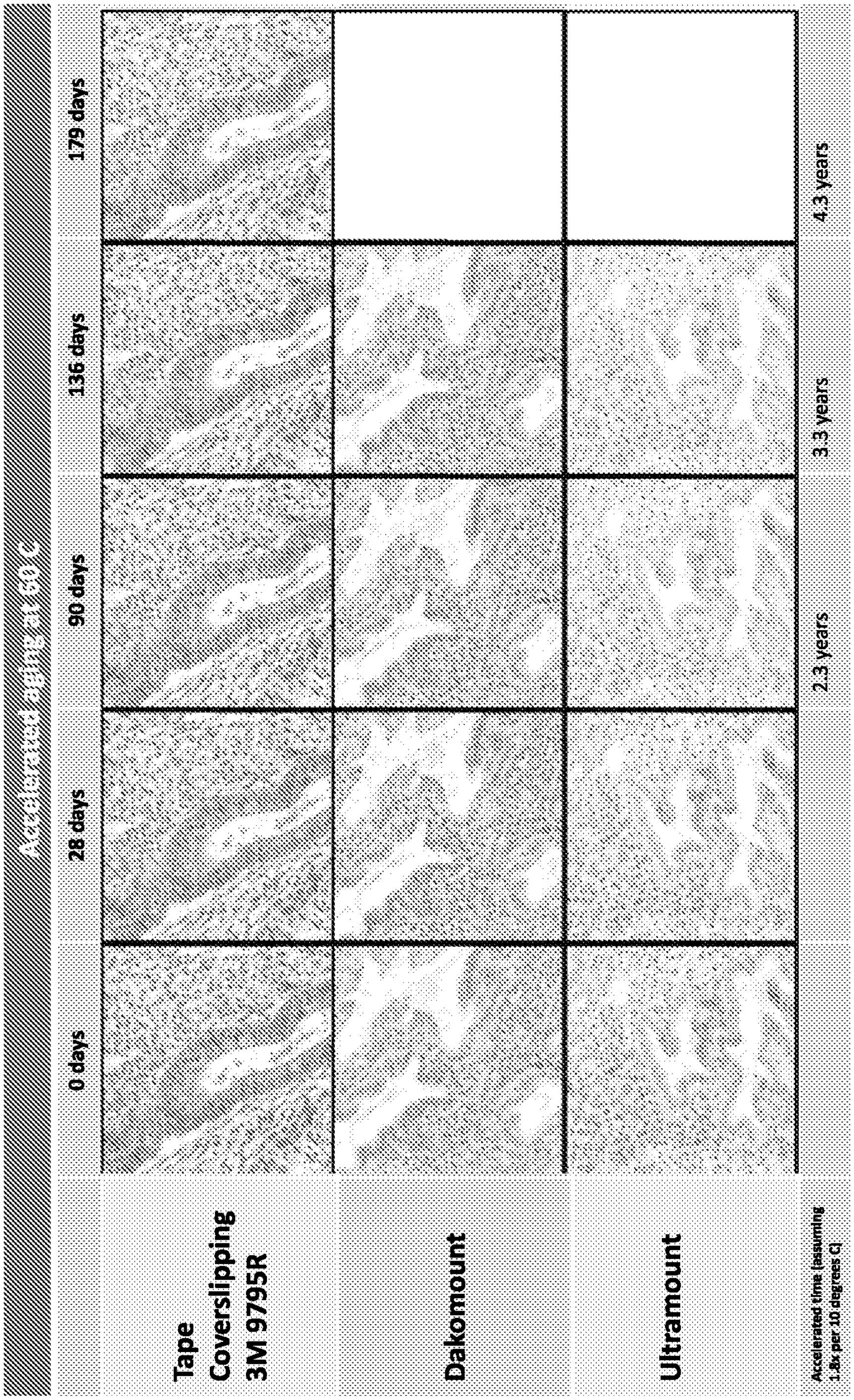
FIGS. 16, 17, 18, 19A and 19B are images of specimens coverslipped on slides as described herein.

The tape 3M9795R available from 3M Company of Maplewood, Minnesota includes a transparent polypropylene backing coated with a silicone adhesive with a release liner. A 24 mm wide roll of the tape was loaded on a coverslipping module like that illustrated in FIG. 4A. The coverslipping module was configured to dispense the adhesive tape as shown in FIG. 10. Slides were manually removed from a Clearify™ prewet solvent bath, placed on the slide table 402, and the apparatus was activated using a computer. Coverslip tape was applied to each slide, followed by lamination. The laminator actuator pressure was 80 psi and the linear stage speed was 10 mm/s. Examples of scanned images of the coverslipped samples are shown in FIG. 16.

Example 2

This example evaluates the ability to remove the present coverslip tape after it has been adhered to a specimen and slide. With some of the samples in Example 1, attempts were made to remove the coverslip after application. The coverslip tape was easily peeled from the first sample after 3 minutes and left the intact tissue sample behind, as well as a residue of soft adhesive that could be rinsed off with Clearify™. For the second sample, the coverslip tape was peeled after one week, and much of the tissue sample was lifted off the slide. For the third sample, the coverslip tape was peeled after one month storage at 60° C., and the sample was completely lifted off of the slide. It is believed that solvents such as Clearify™ interact with the adhesive, softening it and causing it to swell into the tissue. Over time the Clearify™ evaporates, leaving the tissue filled with adhesive.

Example 3

In this example, an accelerated aging protocol was used to evaluate coverslipped sample slides prepared in Example 1. The coverslipped sample slides were stored at 60° C. for several weeks to evaluate potential fading of the dyes over 2.3 years, 3.3 years, and 4.3 years. FIG. 16 provides images of coverslipped samples at the various time points. The hematoxylin dye was seen to fade for coverslipped samples using Ultramount coverslipping, while the 3M9795R coverslipped samples were relatively stable.

Example 4

Figure 17:
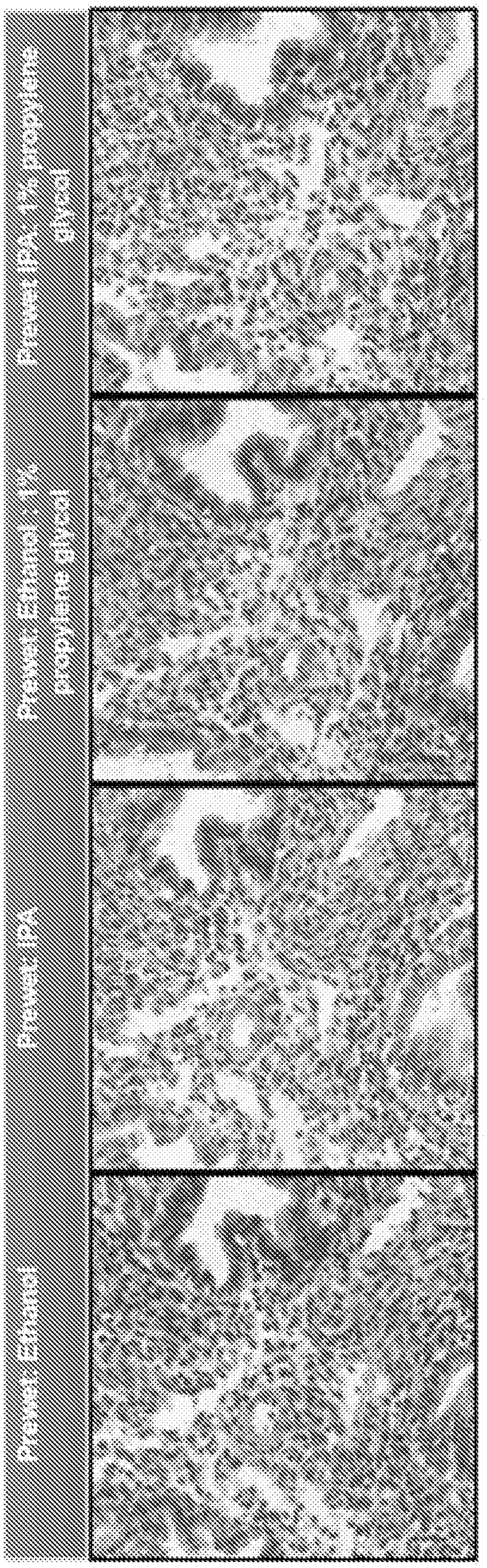

This example evaluates the present coverslipping techniques with an alcohol prewet solvent. Similar to Example 1, samples of uterus tissue were placed on slides, stained with hematoxylin and coverslipped with 3M9795R using the coverslipping module, as described in Example 1. Different prewet solutions were used, including 100% ethanol, 100% isopropyl alcohol (IPA), and each of these with 1% propylene glycol. Excellent coverslip performance was achieved. FIG. 17 shows images of the coverslipped samples.

Example 5

Figure 18:
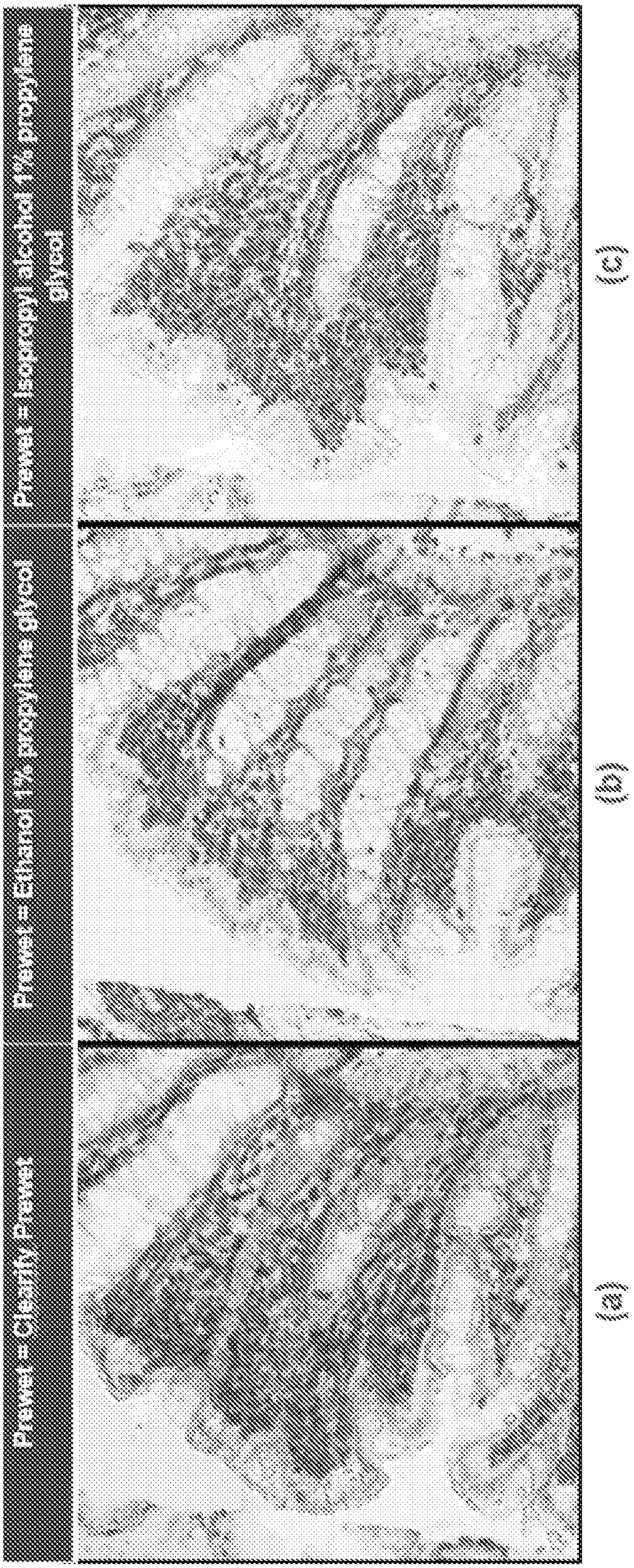

This example evaluates the present coverslipping techniques on IHC stained samples. Samples were contacted with various prewet solvents: Clearify™ and alcohol and polyethylene glycol. The effects of microdewetting and the ability to assemble good IHC images were assessed. Multiblock samples were prepared in a manner similar to Example 1, except the staining used IHC where the antibodies are stained with 3,3'-diaminobenzidine (DAB) and the nuclei are counterstained with hematoxylin. Using 3M9795R as the coverslip, it was found that use of a Clearify™ prewet solvent resulted in areas of micro dry out, as illustrated in FIG. 18, panel (a). Improved coverslipping was accomplished using prewet solutions of ethanol and 1% propylene glycol, as shown in FIG. 18, panels (b) and (c). Those coverslipped samples did not exhibit solvent voids.

Example 6

Figure 19B:
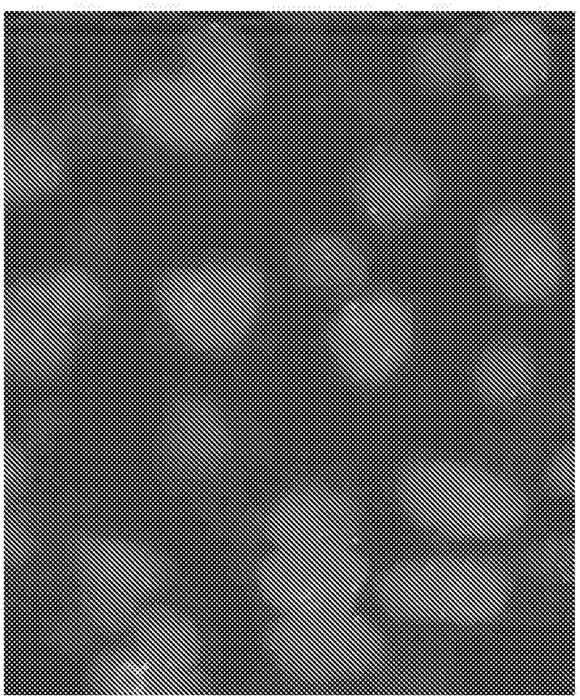
Figure 19A:
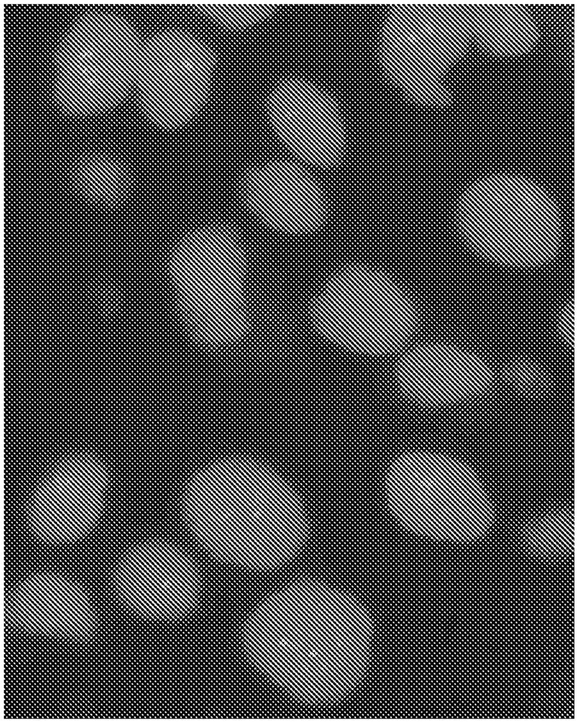

This example evaluates the use of the present coverslipping techniques for FISH samples. Similar to Example 1, samples were prepared, but they were stained for FISH. Dako Fluorescence Mounting Medium was applied to the samples as a prewet solvent, then the samples were covered with 3M8211 acrylic transfer tape available from 3M Company of Maplewood, Minnesota and a glass coverslip. Fluorescence microscopy on the coverslipped slides revealed foci of nucleic acid staining as well as cellular counterstaining. The fluorescence background was higher in the tape-based experiment (FIG. 19B) than the control (FIG. 19A).

Example 7

Figure 20:
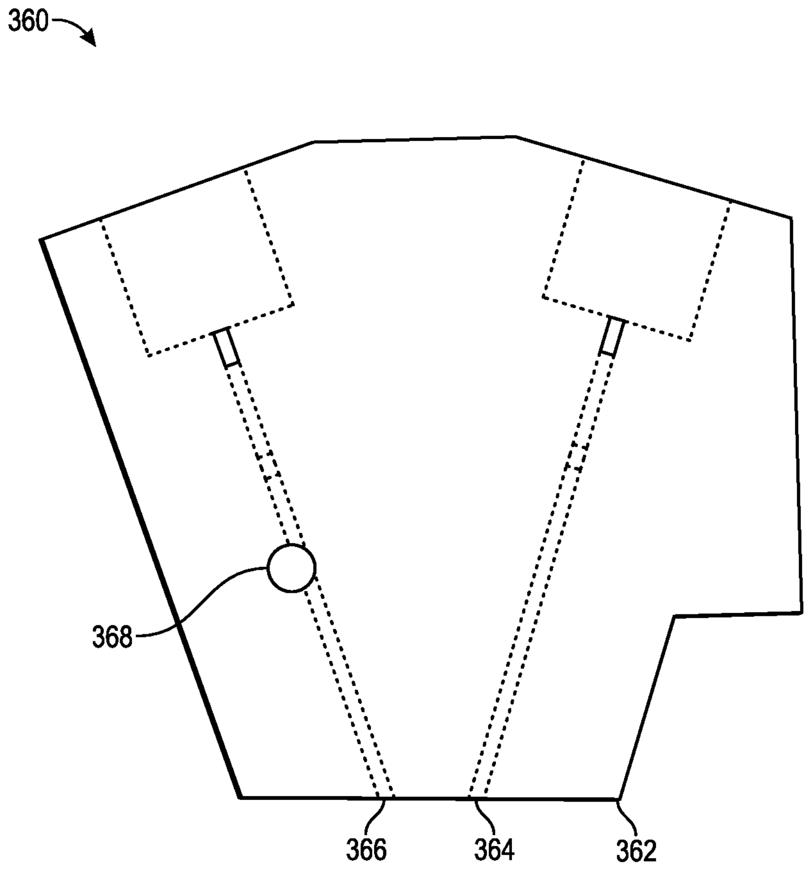
FIG. 20 shows another exemplary embodiment of a solvent exchange module.

In some embodiments, a Solvent Exchange Module (such as those illustrated in FIGS. 5, 7A and 7B) can also comprise a Capillary Head 360 that is swept across the surface of the Slide 10 using a Linear Stage 403, as illustrated in FIG. 20. The Capillary Head comprises a Capillary Surface 362 that is positioned close to the slide surface at a distance of 0.02 mm to 3 mm and preferably in the range of 0.5 mm and 2 mm. The Capillary Head 360 also comprises a Solvent Supply Port 364 fluidically connected to a dispenser (such as first dispenser 520 in FIG. 5) and a Solvent Return Port 366 fluidically connected to a Solvent Return (such as solvent return 550). The flow rate of the Solvent Return is adjusted so that it exceeds the flow of the First Dispenser 320 thereby ensuring the removal of excess solvent between the Capillary Surface and the Slide. The Solvent Return Port is situated so that that air is drawn for return flow in excess of the supply flow. Optionally an Air Vent 368 is provided on the Capillary Head for return flow in excess of the supply flow.

Example 8

Different designs of the Capillary Head 360 can be employed to improve performance, as illustrated in FIGS. 21A to 21D. Key design variations include different shapes of the Solvent Supply Port 364 and Solvent Return Port 366, as well as their relative positions on the Capillary Surface 362. Contouring the Capillary Surface can also be used to effect the flow characteristics of the Capillary Head.

Figure 21D:
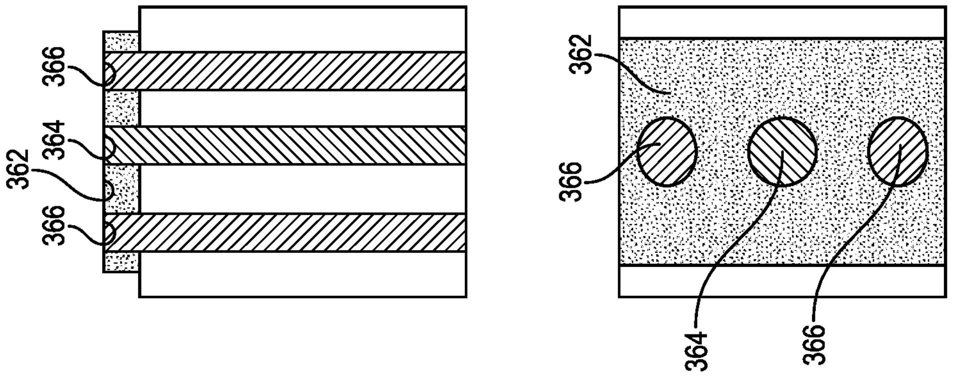
FIGS. 21A-D show different embodiments of a capillary head for solvent exchange.
Figure 21C:
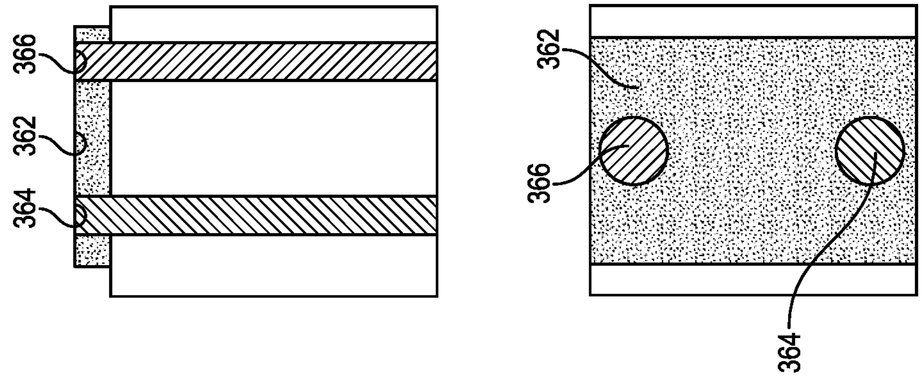
Figure 21B:
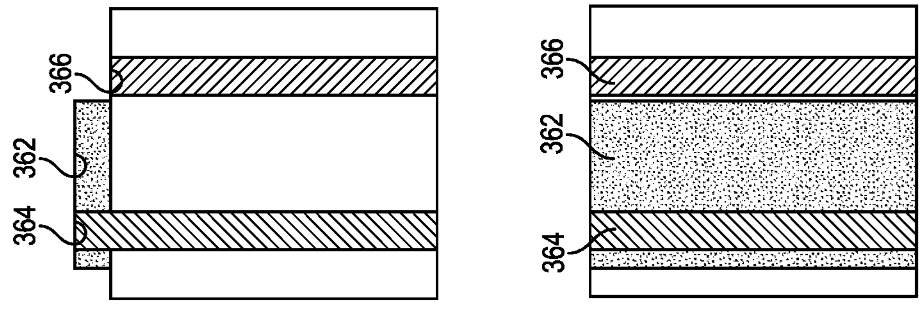
Figure 21A:
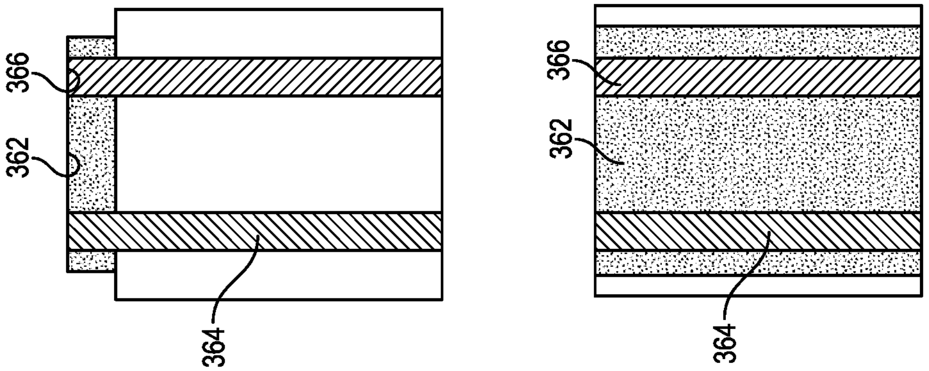

In Example 8, FIG. 21A, the Solvent Supply Port 364 and Solvent Return Port 366 are both shaped as slots that span across the slide width. Both ports are positioned on the Capillary Surface 362.

In Example 8, FIG. 21B, the Solvent Return Port is positioned off the Capillary Surface 363. This design has the advantage of ensuring that Solvent is removed only as it spills from the Capillary Surface.

In Example 8, FIG. 21C, the Solvent Supply Port 364 and Solvent Return Port 366 are both circular holes. This design has the advantage of simpler fabrication and well swept flow.

In Example 8, FIG. 21D, there are two Solvent Return Ports 366 positioned at the ends of the Capillary Surface. This design has the advantage of a shorter path between the Solvent Supply Port and Solvent Return Ports.

Example 9

Figure 4A:
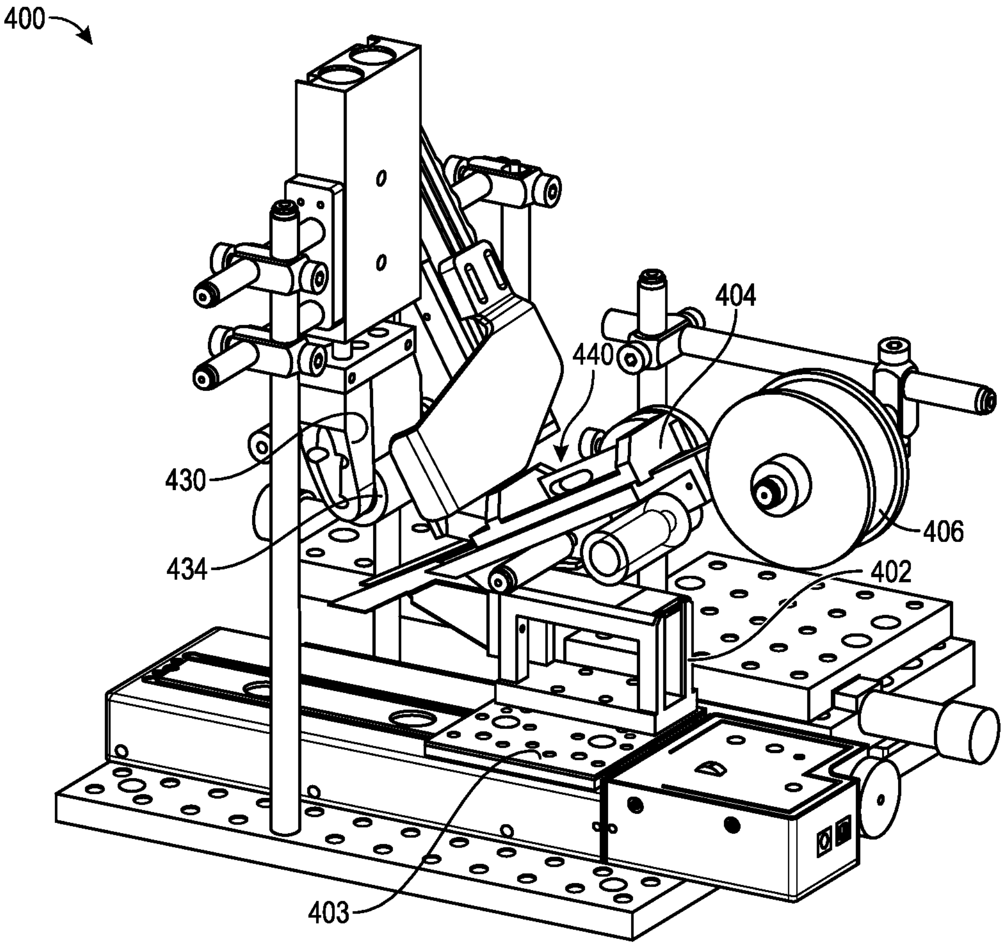
FIGS. 4A to 4E show various views and aspects of an exemplary embodiment of a coverslipping module.
Figure 4C:
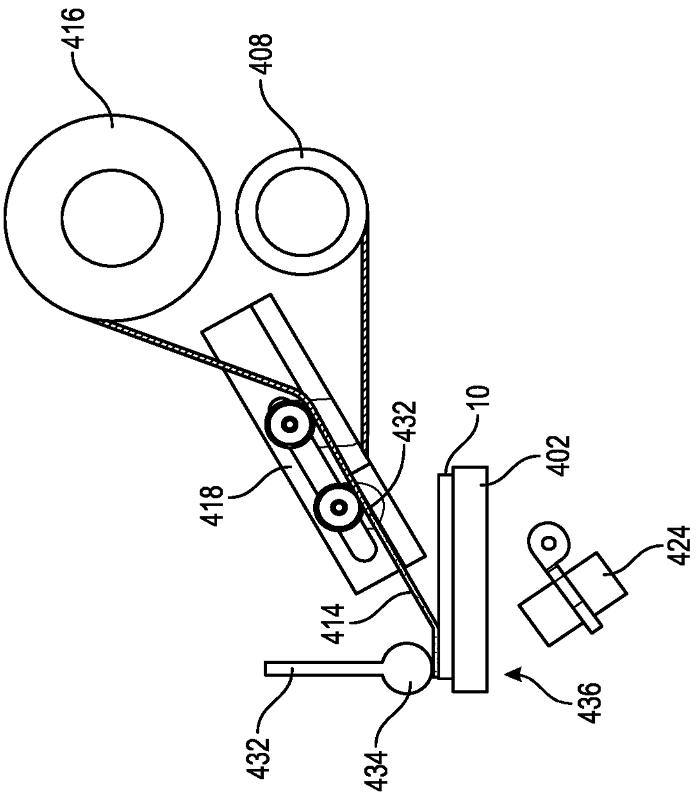
Figure 4B:
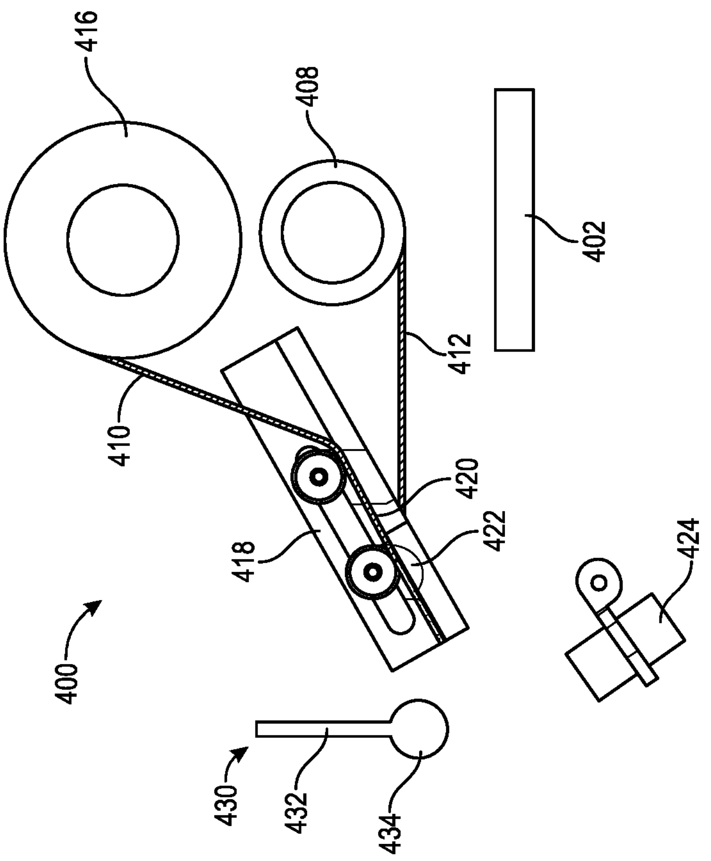
Figure 4D:
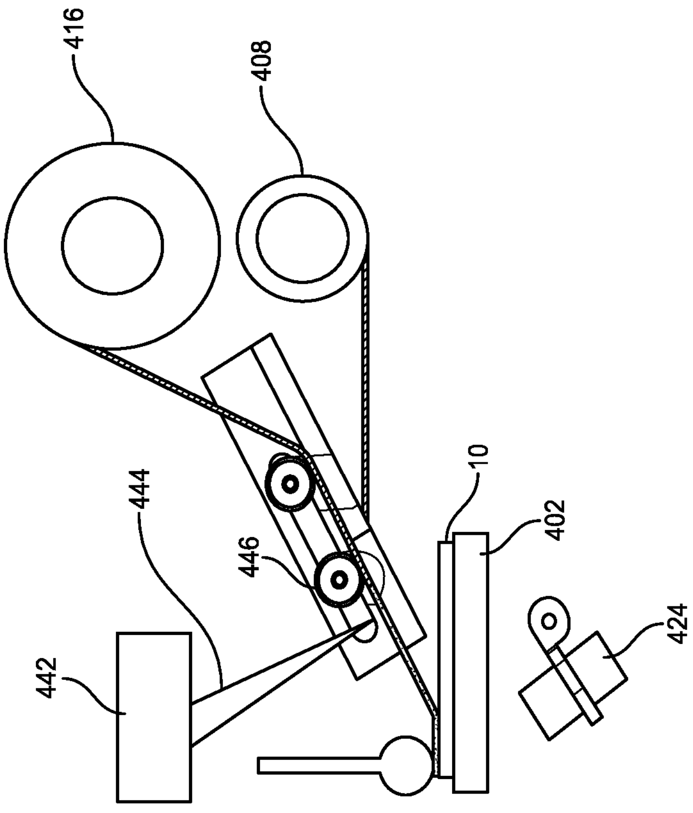
Figure 4E:
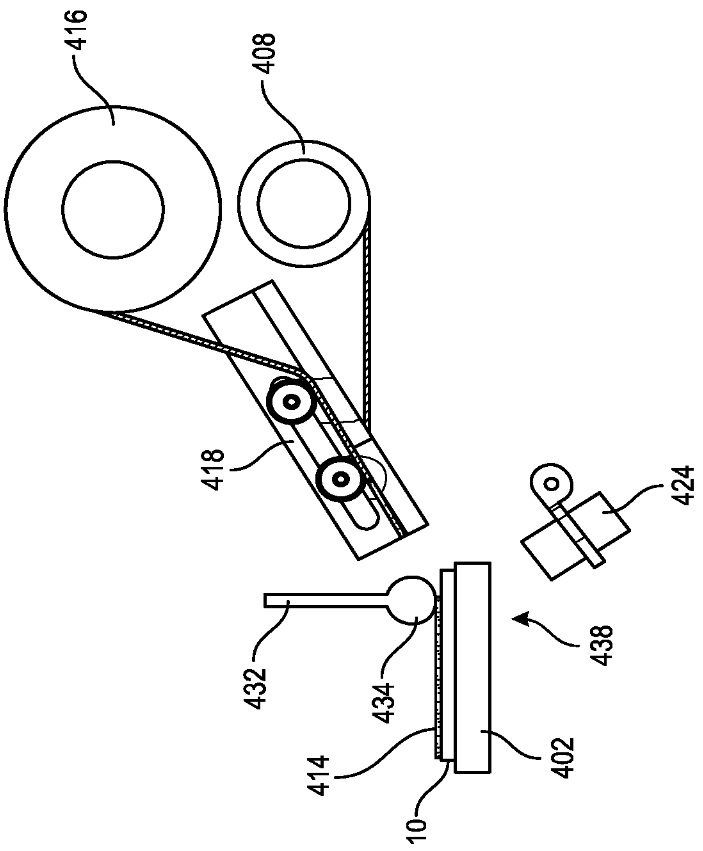
Figure 22:
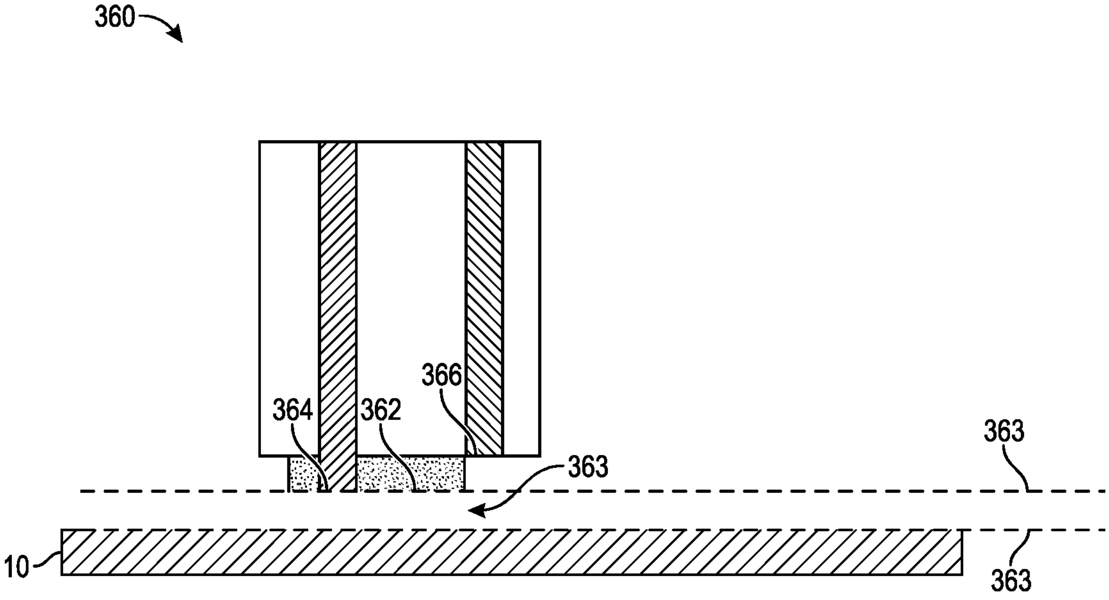
FIG. 22 shows an embodiment of a method of using a capillary head for solvent exchange.

A Capillary Head 360 of the design in FIG. 21B was used. The Capillary Surface 362 was positioned above the Slide 10 with a Capillary-Surface-to-Slide Gap 363 of 0.5 mm, as illustrated in FIG. 22. A First Dispenser (such as first dispenser 520 in FIG. 5) provided First Solvent 95% ethanol at a rate of 1.5 ml/s. The Solvent Return Pump was a vacuum trap set at 50 kPA. The following protocol was carried out Table 1, using a system as illustrated in FIGS. 4A and 5, and described above.

TABLE 1

| Protocol for Example 9 Solvent Exchange | |
|---|---|
| Step 1 | The Slide 10 is removed from a water tank and placed on the Slide Mount Table 402. |
| Step 2 | The Slide Mount Table 402 is positioned under the Capillary Head 360 at the label end of the slide. |
| Step 3 | The Solvent Return Pump 551 is activated with 50 kPA of vacuum. |
| Step 4 | The First Dispenser 520 is activated with 1.5 ml/s 95% ethanol. |
| Step 5 | The Linear Stage 403 is translated at 20 mm/s until it has moved 80 mm, and then stops. |
| Step 6 | The First Dispenser 520 is turned off. |
| Step 7 | The Solvent Return Pump 551 is turned off. |
| Step 8 | The First Dispenser 520 is turned on for 100 ms and then turned off (this fills the capillary gap with solvent). |
| Step 9 | The Linear Stage 403 is translated at 20 mm/s to the start position. |
| Step 10 | Tape application and lamination is carried out. |

Figure 23:
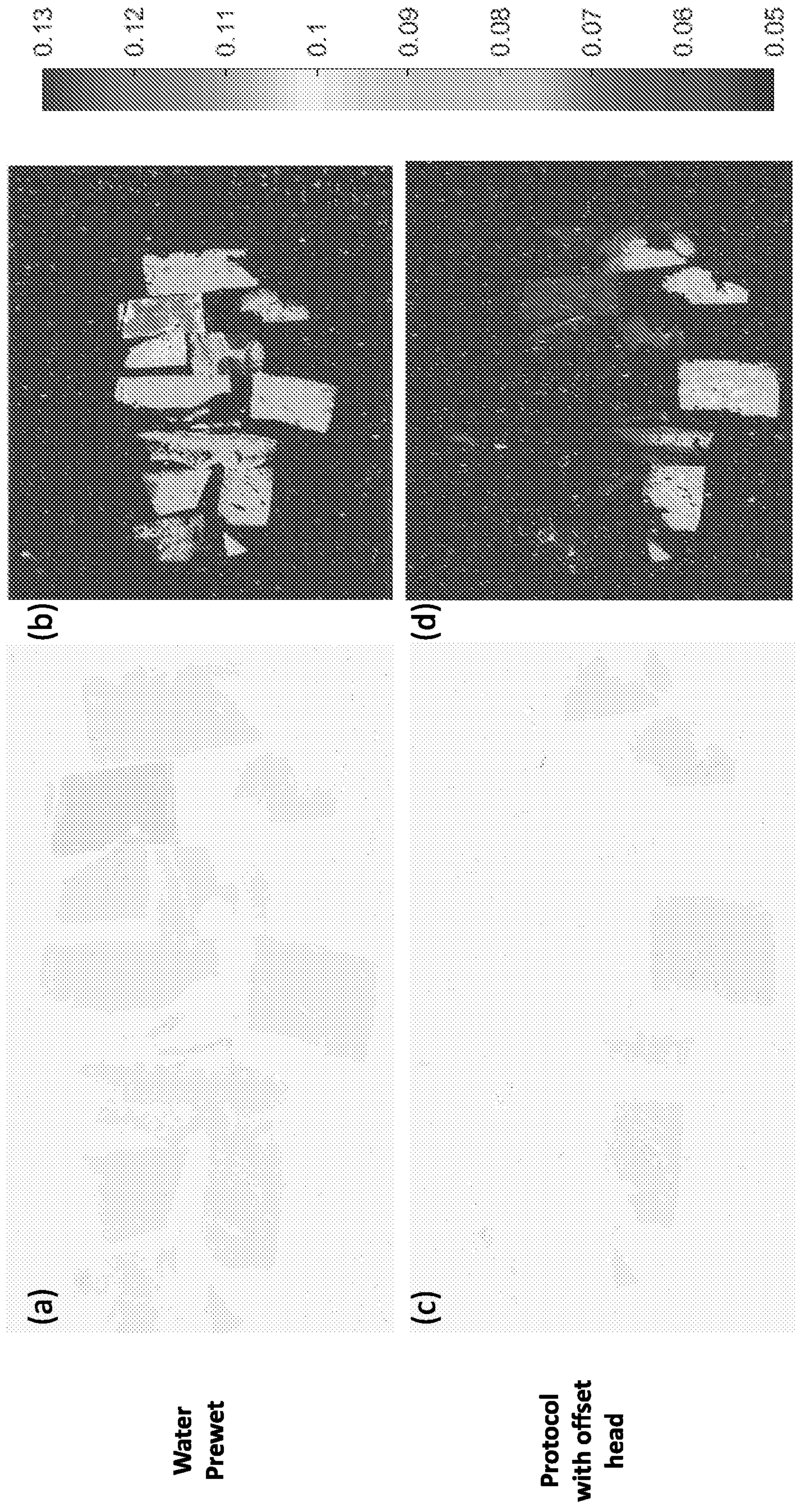
FIG. 23 shows an image and heat map analysis of an unstained tissue section processed using embodiments of the present apparatus.

This protocol was carried out on a multiblock tissue section with unstained tissue, as illustrated in FIG. 23. A tissue section was prepared with no solvent exchange. FIG. 23, panel a, shows the image and FIG. 23, panel c shows a heat map for the section. A second section was treated with this protocol where the Capillary Head 360 was purposely misaligned to treat only the upper half of the slide: image in FIG. 23, panel b and absorbance heat map in FIG. 23, panel d.

Figure 24:
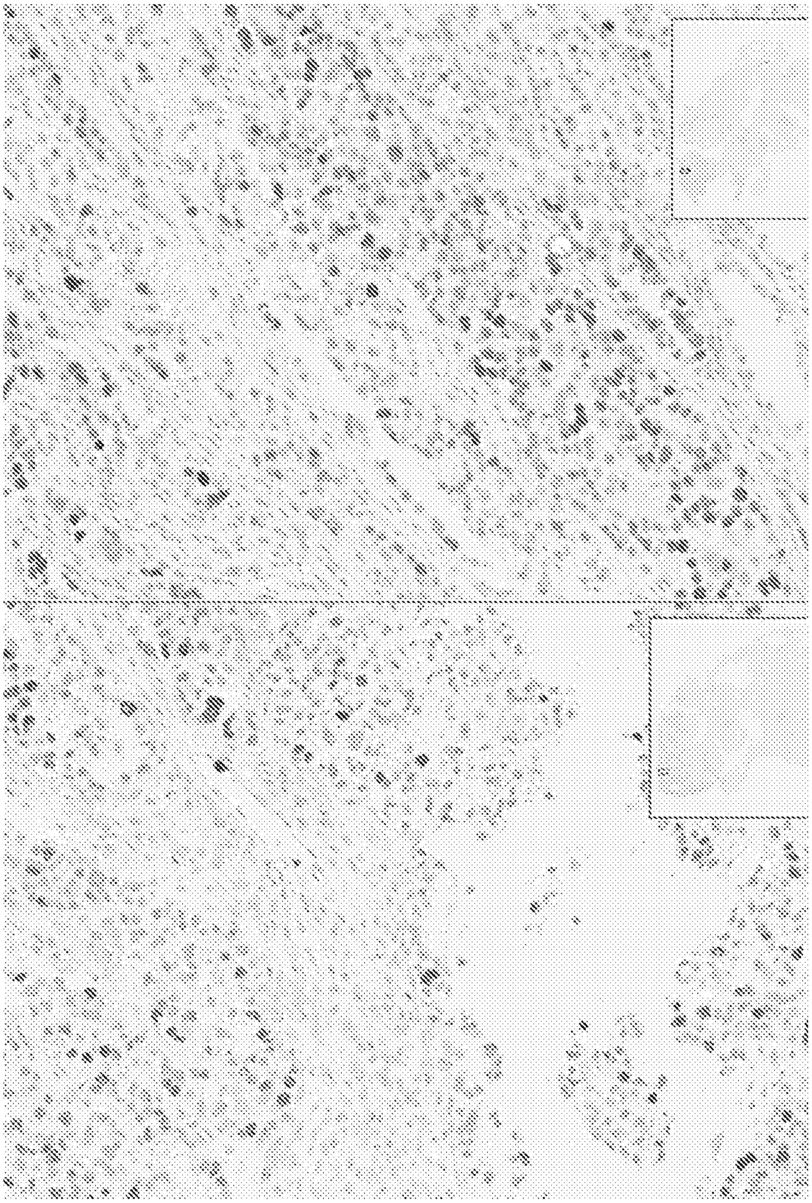
FIG. 24 shows images of specimens processed as described in Example 9.

This protocol was also carried out on ovary tissue sections stained with K167 and hematoxylin. The control section was treated by immersion in 100% ethanol for 2 minutes is shown in FIG. 24, panel a. The experiment section was treated using this protocol is shown in FIG. 24, panel b.

Exemplary Embodiments

Exemplary embodiments provided in accordance with the presently disclosed subject matter include, but are not limited to, the following:

Embodiment 1. A method of preparing a covered sample slide for optical analysis such as light microscopy, comprising: contacting a sample (such as a tissue section) on a slide with a mounting medium, wherein the mounting medium does not contain xylene; covering the sample on the slide with a coverslip, wherein the coverslip has first and second major surfaces and comprises a pressure sensitive adhesive on the first major surface facing the sample; and applying a suitable pressure to the tape, thereby adhering the coverslip tape to the slide.

Embodiment 2. The method of embodiment 1, wherein the coverslip comprises a coverslip tape.

Embodiment 3. The method of embodiment 2, wherein clean coverslip tape is wound on a tape reel, and the method further comprises: unwinding a section of the clean coverslip tape and applying the unwound section to the slide.

Embodiment 4. The method of any of embodiments 2 to 3, wherein the clean coverslip tape is on a release layer, and the method comprises separating the coverslip tape from the release layer. In some embodiments, the release layer has a release layer end, and the release layer end is spooled on a release layer reel. Rotation of the release layer reel can advance or drive the coverslip tape.

Embodiment 5. The method of any of embodiments 1 to 4, further comprising placing the sample on the slide and removing a solvent from the specimen before covering the sample.

Embodiment 6. The method of any of embodiments 1 to 5, further comprising partially or fully dewatering the sample after placing on the slide. For example, the specimen can be partially dewatered to a water content between 0% and 20%, and preferably less than 15%.

Embodiment 7. The method of embodiment 6, wherein the sample is partially or fully dewatered by solvent exchange.

Embodiment 8. The method of embodiment 7, wherein an exchange solvent is applied to the sample by spraying.

Embodiment 9. The method of embodiment 8, further comprising blowing a line of gas (e.g., use of an air knife to blow air) on the sample so as to evaporate solvent.

Embodiment 10. The method of embodiment 7, wherein an exchange solvent is applied to the sample by flowing across the sample through a capillary gap. For example, wherein the slide is moved relative to the capillary gap to treat a larger surface area.

Embodiment 11. The method of embodiment 7, where a piezo transducer is applied to the slide to induce high frequency pressure waves to speed up the solvent exchange.

Embodiment 12. The method of any of embodiments 1 to 11, further comprising removing the slide from a slide carrier and placing the slide on a slide table. In some embodiments, the slide table has a slide table surface configured to hold a slide and to prevent motion by the slide. The slide table surface can be substantially horizontal or at an angle.

Embodiment 13. The method of any of embodiments 1 to 12, wherein the pressure sensitive adhesive penetrates holes in the sample.

Embodiment 14. The method of any of embodiments 1 to 13, wherein the pressure is applied to the coverslip tape by rolling a roller over the coverslip tape, for example at a pressure of 60 psi. The roller can move in one direction over the tape, or in a first direction followed by a second direction (e.g., moving forward and back along the tape). The roller can roll over the tape one or more times, and the applied pressure can be the same or different each time.

Embodiment 15. A coverslipping module comprising: a slide mount table having a surface for a slide and comprising one or more slide stops to prevent or reduce movement of the slide on the slide mount table; a linear actuator to move the slide mount table in a direction of a long axis of a slide on the slide table; a coverslip tape dispenser above the slide mount table having a feed end and an extrusion end, wherein the coverslip tape dispenser is configured to receive a coverslip tape at the feed end and to extrude the coverslip tape from the extrusion end at an angle to the slide on the slide mount table; and a roller positioned after the extrusion end of the tape dispenser and configured to roll and apply pressure to the coverslip tape on the slide.

Embodiment 16. The apparatus of embodiment 15, further comprising a release liner reel to receive a release liner from the coverslip tape dispenser. The reel may be positioned by the feed end of the coverslip tape dispenser.

Embodiment 17. The apparatus of any of embodiment 15 or 16, wherein the tape dispenser comprises a release liner separator such as a wedge or roller, to separate the release liner from the coverslip tape.

Embodiment 18. A solvent exchange module for a sample on a slide, the solvent exchange module comprising: a support for a slide; a gas supplier above the support configured to blow a line of gas onto a slide on the support; wherein one or both of the support and the gas supplier are configured for linear motion.

Embodiment 19. The module of embodiment 18, wherein the support is a conveyor.

Embodiment 20. The module of embodiment 18, wherein the support comprises a heater (such as a resistive heater embedded in the support).

Embodiment 21. An apparatus for preparing a covered specimen slide comprising a solvent exchange module; and a coverslipping module.

Embodiment 22. The apparatus of embodiment 21, further comprising a slide handler module.

Embodiment 23. A coverslipped sample slide that is essentially free of xylene, comprising a slide having a sample on a surface; a coverslip tape adhered to the sample, wherein essentially all of the sample is covered by the coverslip tape; a mountant in contact with the sample between the coverslip tape and the slide, wherein the mountant is not xylene.

Embodiment 24. The slide of embodiment 23, wherein the mountant comprises one or more $C_{1-4}$ alcohols or $C_{1-4}$ glycols.

Embodiment 25. The slide of embodiment 23 or 24, wherein the sample comprises one or more dyes, such as fluorescent dyes.

Embodiment 26. The slide of any of embodiments 23 to 25, wherein the dyed sample is stable for a period of at least ten years.

Embodiment 27. A coverslipping apparatus comprising a coverslip tape dispenser configured to apply an adhesive side of a coverslip tape to a sample on a slide.

Embodiment 28. A solvent exchange module for a sample on a slide, the solvent exchange module comprising: a support for a slide; a solvent exchange head for dispensing an exchange liquid and removing a drained liquid, wherein the solvent exchange head can be positioned at a distance from the slide, and one or both of the support and the solvent exchange are configured for linear motion.

Embodiment 29. The solvent exchange module of embodiment 28, wherein the solvent exchange head comprises an exchange surface that faces the slide, wherein the exchange surface comprises raised portions surrounding the draining holes.

Embodiment 30. The solvent exchange module of embodiment 28 or 29, wherein the exchange surface has a length and a width, and the width is substantially the same as a slide width.

Embodiment 31. The solvent exchange module of any of embodiments 28 to 30, further comprising a reservoir for containing the exchange liquid, one or more dispense lines connecting the reservoir and the solvent exchange head, and one or more return lines connecting the reservoir and the solvent exchange head.

Embodiment 32. The solvent exchange module of embodiment 31, wherein the distance between the exchange head and the slide creates a capillary gap. Furthermore, the solvent exchange module can be moved across the slide to treat an area larger than the solvent exchange head.

Embodiment 33. The solvent exchange module of any of embodiments 28 to 32, further comprising a piezo transducer configured to induce high frequency pressure waves to speed up the solvent exchange on the slide.

Embodiment 34. The solvent exchange module of any of embodiments 28 to 33, further comprising a dispensing pump fluidically connected to the dispensing line, and at least one return pump connected to the one or more return lines.

Embodiment 35. A method of preparing a sample slide for analysis, comprising: providing a sample on a slide, wherein the sample comprises a first solvent; forming a capillary gap between the sample (such as a tissue section) on the slide and a solvent exchange head; dispensing an exchange liquid comprising a second solvent from a dispensing hole in the solvent exchange head; and removing a drained liquid from the capillary gap.

Embodiment 36. The method of embodiment 35, wherein the first solvent comprises water and the second solvent comprises an alcohol (such as ethanol).

Embodiment 37. The method of embodiment 35 or 36, wherein the drained liquid comprises a mixture of the first and second solvents.

Embodiment 38. The method of any of embodiments 35 to 37, further comprising passing the drained liquid to a reservoir, wherein the reservoir contains an exchange liquid comprising the second solvent.

Embodiment 39. The method of any of embodiments 35 to 38, wherein the exchange liquid is retained below the exchange head during the dispensing and removing steps.

Embodiment 40. The method of any of embodiments 35 to 39, wherein the solvent exchange head dispenses the second solvent through a dispensing hole in a middle portion of the solvent exchange head.

Embodiment 41. The method of any of embodiments 35 to 40, further comprising partially or fully removing the first solvent from the sample after placing on the slide. For example, when the sample comprises water as the first solvent, the sample can be partially dewatered to a water content between 0% and 20%, and preferably less than 15%.

Embodiment 42. The method of embodiment 41, wherein the sample is partially or fully dewatered by solvent exchange.

Embodiment 43. The method of embodiment 42, wherein one or more dispense lines provides an exchange liquid to the slide, and one or more return lines removes a draining liquid from the slide.

Embodiment 44. The method of embodiment 43, wherein the path of the dispense lines to the return lines creates a capillary gap for the solvent to move.

Embodiment 45. The method of any of embodiments 35 to 44, where a piezo transducer is applied to the slide to induce high frequency pressure waves to speed up the solvent exchange.

Embodiment 46. The method of any of embodiments 35 to 45, wherein the exchange liquid is applied to the sample for 60 seconds or less for solvent exchange.

Embodiment 47. The method of any of embodiments 35 to 46, wherein the exchange liquid is applied to the sample for about 5 seconds or less.

Embodiment 48. The method of any of embodiments 35-47, further comprising covering the sample on the slide with a coverslip, wherein the coverslip has first and second major surfaces and comprises a pressure sensitive adhesive on the first major surface facing the sample.

Embodiment 49. The method of any of embodiments 35-48, wherein the process of covering the sample with a coverslip takes about 5 seconds or less.

Embodiment 50. The method of embodiment 49, wherein the slide is placed in a slide carrier after the sample is covered with the coverslip.

Embodiment 51. The method of embodiment 50, wherein the process of placing the slide in the slide carrier takes about 5 seconds or less.

It is to be understood that the terminology used herein is for purposes of describing particular embodiments only and is not intended to be limiting. The defined terms are in addition to the technical and scientific meanings of the defined terms as commonly understood and accepted in the technical field of the present teachings.

REFERENCES

International Publication No. WO1999/053357
International Publication No. WO2002/012857
International Publication No. WO2014071959 (A1)
International Publication No. WO0212857 (A1)
U.S. Pat. No. 6,589,650 (B1)
GB Publication No. 2482726 (A)
International Publication No. WO9953357 (A1)
U.S. Pat. No. 4,203,797 (A)
U.S. Pat. No. 4,853,262 (A)
US Pat. App. Pub. No. 2010081579 (A1)
US Pat. App. Pub. No. 2002037269 (A1)
US Pat. App. Pub. No. 2007166197 (A1)
U.S. Pat. No. 5,569,527 (A)
International Publication No. WO2005085799 (A1)
EP Publication No. 1438585 (A1)
EP Publication No. 1309847 (A1)
US Pat. App. Pub. No. 2010069259 (A1)

In view of this disclosure it is noted that the methods and apparatus can be implemented in keeping with the present teachings. Further, the various components, materials, structures and parameters are included by way of illustration and example only and not in any limiting sense. In view of this disclosure, the present teachings can be implemented in other applications and components, materials, structures and equipment to implement these applications can be determined, while remaining within the scope of the appended claims.

We claim:

1. A method of preparing a covered sample slide for optical analysis, comprising:

contacting a sample on a slide with a mounting medium, wherein the mounting medium does not contain xylene;

covering the sample on the slide with a coverslip, wherein the coverslip has first and second major surfaces and comprises a pressure sensitive adhesive on the first major surface facing the sample, wherein the pressure sensitive adhesive penetrates holes in the sample; and applying a suitable pressure to the coverslip, thereby adhering the coverslip to the slide.

2. The method of claim 1, wherein the coverslip comprises a coverslip tape.

3. The method of claim 2, wherein the coverslip tape is wound on a tape reel, and the method further comprises:

unwinding a section of the coverslip tape and applying the unwound section to the slide.

4. The method of claim 2, wherein the coverslip tape is on a release layer, and the method comprises separating the coverslip tape from the release layer.

5. The method of claim 1, further comprising placing the sample on the slide and removing a solvent from the specimen before covering the sample.

6. The method of claim 1, further comprising partially or fully dewatering the sample after placing on the slide.

7. The method of claim 6, wherein the sample is partially or fully dewatered by solvent exchange.

8. The method of claim 7, wherein an exchange solvent is applied to the sample by spraying.

9. The method of claim 8, further comprising blowing a line of gas on the sample so as to evaporate solvent.

10. The method of claim 7, where a piezo transducer is applied to the slide to induce high frequency pressure waves to speed up the solvent exchange.

11. The method of claim 6, wherein an exchange solvent is applied to the sample by flowing across the sample through a capillary gap.

12. The method of claim 11 wherein the slide is moved relative to the capillary gap to treat a larger surface area.

13. The method of claim 1, further comprising removing the slide from a slide carrier and placing the slide on a slide table.

* * * * *